(12) United States Patent
Vollmar et al.

(10) Patent No.: US 12,252,866 B2
(45) Date of Patent: Mar. 18, 2025

(54) LOADER WITH PIVOTING BATTERY ARRAY SUPPORT

(71) Applicant: Manitou Equipment America, LLC, West Bend, WI (US)

(72) Inventors: Don Vollmar, Mequon, WI (US); Tyler James Handel, Menomonee Falls, WI (US); Kyle Ressler, West Bend, WI (US)

(73) Assignee: Manitou Equipment America, LLC, West Bend, WI (US)

( * ) Notice: Subject to any disclaimer, the term of this patent is extended or adjusted under 35 U.S.C. 154(b) by 374 days.

(21) Appl. No.: 17/905,730

(22) PCT Filed: Feb. 25, 2021

(86) PCT No.: PCT/US2021/019611
§ 371 (c)(1),
(2) Date: Sep. 6, 2022

(87) PCT Pub. No.: WO2021/178202
PCT Pub. Date: Sep. 10, 2021

(65) Prior Publication Data
US 2023/0109143 A1     Apr. 6, 2023

Related U.S. Application Data

(60) Provisional application No. 62/986,481, filed on Mar. 6, 2020.

(51) Int. Cl.
*E02F 9/08*     (2006.01)
*B60K 7/00*     (2006.01)
(Continued)

(52) U.S. Cl.
CPC ............ *E02F 9/207* (2013.01); *B60K 7/0007* (2013.01); *B60K 17/046* (2013.01);
(Continued)

(58) Field of Classification Search
CPC ....... E02F 9/207; E02F 9/0808; E02F 9/0891; E02F 9/18; E02F 3/283; E02F 3/3663;
(Continued)

(56) References Cited

U.S. PATENT DOCUMENTS 7,810,597 B2   10/2010   Imashige
8,540,042 B2    9/2013   Atarashi
(Continued)

FOREIGN PATENT DOCUMENTS

| JP | 2007224585 A | 9/2007 |
|---|---|---|
| JP | 2012202067 A | 10/2012 |
| WO | 2011158686 A1 | 12/2011 |

OTHER PUBLICATIONS

International Search Report and Written Opinion mailed Jun. 16, 2021 for international PCT patent application No. PCT/US21/19611.

*Primary Examiner* — John D Walters
(74) *Attorney, Agent, or Firm* — Husch Blackwell LLP

(57) ABSTRACT

An electric loader is provided with a plurality of independently driven wheels. For example, a four-wheeled electric loader includes four independently operated wheels, each directly coupled to a dedicated electric motor. A fifth independent electrical motor powers the lift arm and/or any attachments coupled to an auxiliary hydraulic. A central forced-air system supplies pressurized air to each independent electric motor to cool the electric motor during operation. In some embodiments, the auxiliary electric motor powers the fan and/or air conditioner of the central forced-air system. A lever and/or electric brake may be applied to an axle of the electric motors. A pivotable battery panel locks a plurality of battery cells to provide a central source of power, counter-weight the loader arm, and rotate away to provide the operator access to an internal cavity of the cab.

20 Claims, 36 Drawing Sheets

(51) Int. Cl.
*B60K 17/04* (2006.01)
*B60K 17/356* (2006.01)
*B60L 50/60* (2019.01)
*B60L 50/64* (2019.01)
*B62D 11/04* (2006.01)
*E02F 3/28* (2006.01)
*E02F 3/36* (2006.01)
*E02F 9/18* (2006.01)
*E02F 9/20* (2006.01)

(52) U.S. Cl.
CPC ............ *B60K 17/356* (2013.01); *B60L 50/66* (2019.02); *B62D 11/04* (2013.01); *E02F 3/283* (2013.01); *E02F 3/3663* (2013.01); *E02F 9/0808* (2013.01); *E02F 9/0891* (2013.01); *E02F 9/18* (2013.01); *B60K 2007/0038* (2013.01); *B60L 2200/40* (2013.01); *B60Y 2200/415* (2013.01)

(58) Field of Classification Search
CPC ..... B60L 50/66; B60K 7/0007; B60K 17/046; B60K 17/356; B62D 11/04
See application file for complete search history.

(56) References Cited

U.S. PATENT DOCUMENTS

| | | | |
|---|---|---|---|
| 8,727,055 B2 * | 5/2014 | Matsumura | B62D 21/186 |
| | | | 180/68.5 |
| 10,829,351 B2 | 11/2020 | Wild et al. | |
| 11,021,071 B2 | 6/2021 | Ito et al. | |
| 11,198,600 B2 | 12/2021 | Radtke et al. | |
| 2013/0078071 A1 * | 3/2013 | Noguchi | B60K 1/04 |
| | | | 414/719 |
| 2019/0381988 A1 | 12/2019 | Matsuda et al. | |
| 2021/0300167 A1 | 9/2021 | Yamada et al. | |
| 2021/0351465 A1 | 11/2021 | Ito et al. | |
| 2022/0248600 A1 | 8/2022 | Yamada et al. | |

* cited by examiner

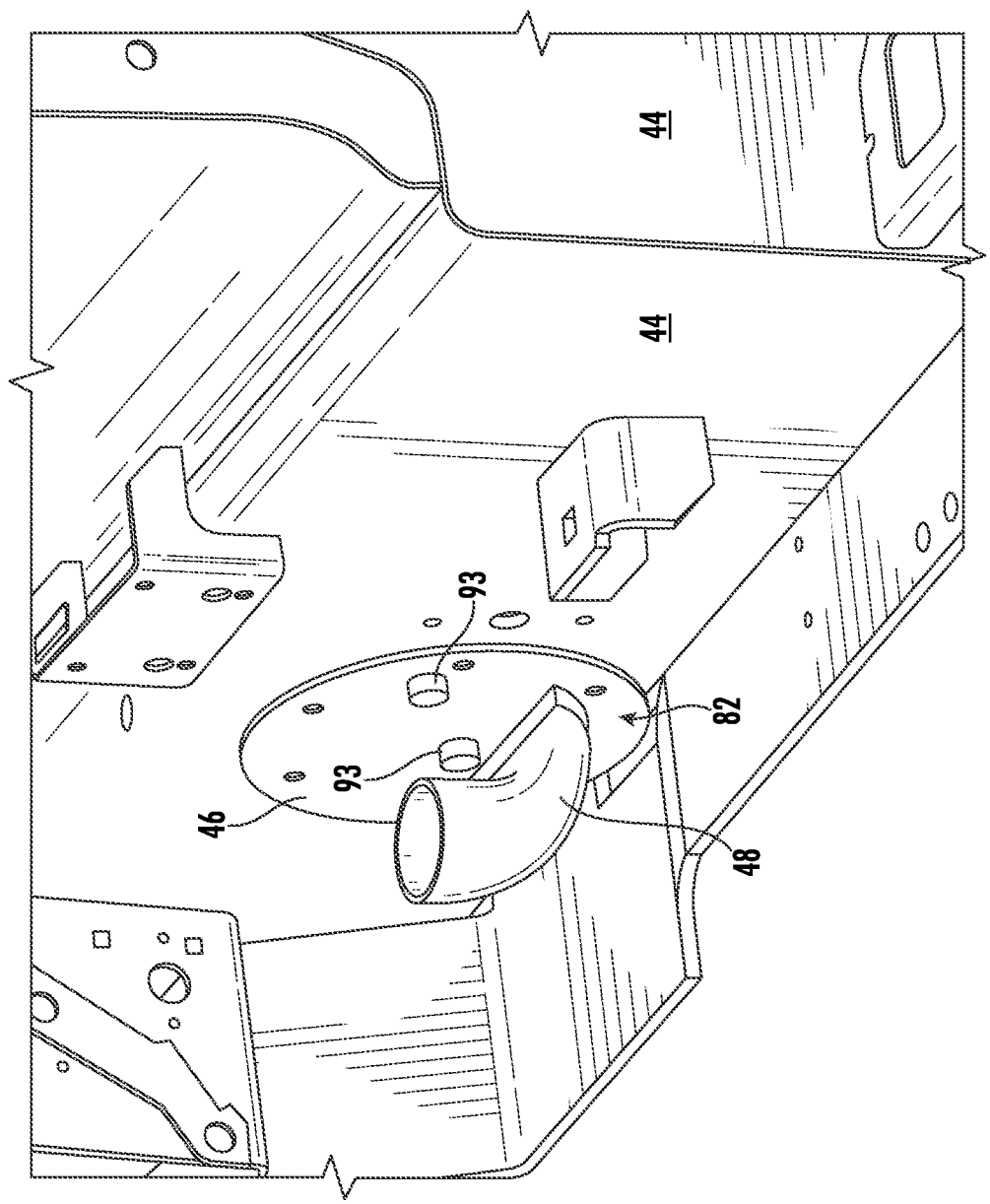

LOADER WITH PIVOTING BATTERY ARRAY SUPPORT

CROSS-REFERENCE TO RELATED PATENT APPLICATION

The present application claims the benefit of and priority to U.S. Patent application No. 62/986,481 filed on Mar. 6, 2020, which is incorporated herein by reference in its entirety.

BACKGROUND OF THE INVENTION

The present invention relates generally to the field of battery powered vehicle loaders such as skid steer and tracked loaders (electric loader), in particular the present invention relates to providing storage and access to the batteries stored within the chassis of an electric loader during loader operation.

SUMMARY OF THE INVENTION

One embodiment of the present invention relates to an electric loader which includes a chassis including a front end and a rear end with a first side extending between the ends and a second side extending between the first and second ends. The second side is offset from and parallel with the first side, and the first and second sides are generally perpendicular to the front and rear ends. An operators station is located between the first and second sides and a hydraulic attachment is supported by the front end of the chassis. A first external drive is coupled to and supports the chassis at the first side relative to a surface upon which the loader operates and a second external drive assembly is coupled to and supports the chassis at the second side relative to the surface. A first electric motor having a gear reducer and directly coupled to a first external drive is located at the first side and a second electric motor having a gear reducer and directly coupled to a second external drive is located at the second side. A third electric motor is coupled to a hydraulic pump in fluid communication with the attachment. A battery panel is pivotally supported at the rear end of the chassis between a stowed position which is parallel to the rear end and a battery access position. A plurality of batteries is electrically coupled to the motors and fastened to the battery panel such that the batteries are stored within the chassis to provide counter weight for the loader, and such that the batteries are accessible from the exterior of the loader when the panel is in the open position.

Another embodiment of the invention relates to an electric loader including a chassis including a front end and a rear end with a first side extending between the ends and a second side extending between the first and second ends, the second side being offset from and parallel with the first side, and the first and second sides are generally perpendicular to the front and rear ends. A first wheel is rotatably supported at the first side and coupled to an first electric motor, a second drive wheel rotatably supported at the second side and coupled to a second electric motor, a hydraulic attachment is supported at the front end of the chassis, and a third electric motor is coupled to a hydraulic pump, the hydraulic attachment being in fluid communication with the hydraulic pump. A battery panel is pivotally supported at the rear end of the chassis between a stowed position which is parallel to the rear end and an battery access position, and a plurality of batteries are electrically coupled to the motors, each battery supported within a battery housing removably fastened to the battery panel such that the batteries and respective housings are stored within the chassis to provide counter weight for the loader, and such that the batteries are accessible from the exterior of the loader when the panel is in the open position.

Another embodiment of the invention relates to an electric loader including a chassis including a front end and a rear end with a first side extending between the ends and a second side extending between the first and second ends, the second side being offset from and parallel with the first side, and the first and second sides are generally perpendicular to the front and rear ends. The loader also includes an operator cab supported by the chassis between the first and second ends, a first electric drive motor mounted at the first side, a second electric drive motor mounted at the second side, a hydraulic attachment supported by the front end of the chassis, and a third electric motor coupled to a hydraulic pump, with the hydraulic attachment being in fluid communication with the hydraulic pump. A battery panel is pivotally supported at the rear end of the chassis between a stowed position which is parallel to the rear end and a battery access position, and a plurality of batteries are electrically coupled to the motors, with each battery supported within a battery housing removably fastened to the battery panel such that the batteries and respective housings are stored within the chassis to provide counter weight for the loader, and such that the batteries are accessible from the exterior of the loader when the panel is in the open position.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which:

FIG. 34 is a view of the cooling duct coupled to the electric motor of FIG. 24 and configured to force air through coils of the electric motor, according to an exemplary embodiment.

DETAILED DESCRIPTION

Figure 1:
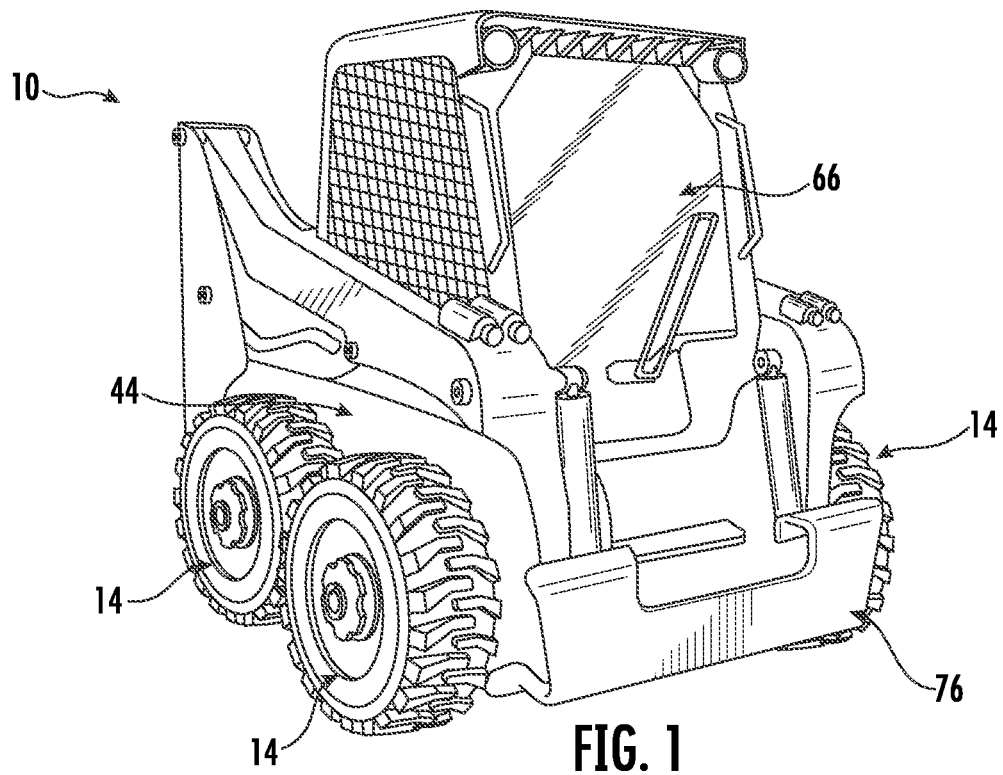
FIG. 1 is a side perspective view of an electric loader with four (4) driven wheels and the loading bucket removed, according to an exemplary embodiment.

Referring generally to the figures, an electrically powered skid steer or lift/loader is shown that uses a control system and four independent electric motors to achieve a variety of different steering and/or traction control modes. The electric lift includes a chassis having front and rear generally parallel ends and sides which are parallel and offset from each other and extend between the ends. The ends and sides are generally perpendicular. The electric lift loader includes four independent drive motors coupled to each wheel (or track) that controls traction and powers each wheel independently. The motors and wheels or tracks are supported at respective sides of the chassis to support and propel the loader upon the surface upon which the loader is located. For example, each wheel has its own independently controlled electric motor that is coupled to the wheel through a gear box (e.g., a planetary reducing gear system). Conventional skid steers include a chain drive that ties both of the wheels on a side of the unit together. In contrast, the electric skid steer independently controls and maps a variety of different steering, drive, and traction modes by independently controlling each of the four wheels with a processor and/or controller. This configuration provides 1, 2, 3, or 4 wheel drive based on user input and/or selection and enables, for example, powering only the rear wheels for efficiency when traction is not scarce or when the loader elevates the front wheels. In addition, steering can power different sets of wheels than forward and rearward directions. For example, one front wheel and one rear wheel could be driven (powered) independently to reduce slipping on turf to reduce turf damage.

In another embodiment, a battery panel (rack) or pack is assembled in a vertical direction to store battery cells, e.g., 12 or more. A pivoting battery panel is installed into a frame of the electric loader to pivot the entire battery panel down (e.g., horizontally). Pivoting the battery box down about a horizontal axis relative to the loader operating surface (horizontally) permits an operator access to an internal cavity of the cab at the rear of the electric loader. In addition, the vertical orientation of the locked and operational battery panel increases the counter-weighting (ballast) of the lifting loader to offset any load applied, e.g., to a loading bucket or lift arm.

Applicant has found that these advantages result in reduced damage to the ground (e.g., turf) and improved tire performance/lifecycle through reduction in skidding and dragging on asphalt, turn, mud, etc. Additional maneuverability is also available, since each electric motor can be independently powered, a user can change or alter the center point of rotation of the machine based on the type/mode of steering. Traction is also improved when the system independently monitors each wheel for slip. Applicant has found that the efficiency of the electric loader is enhanced by delivering powers only to wheels on demand, such that power is consolidated and only used at the times and locations it is needed, to improve the efficiency and battery life of the electric loader system. Similar electric motors drive conventional hydraulic systems to control lift arms, accessories, and other attachments.

Figure 2:
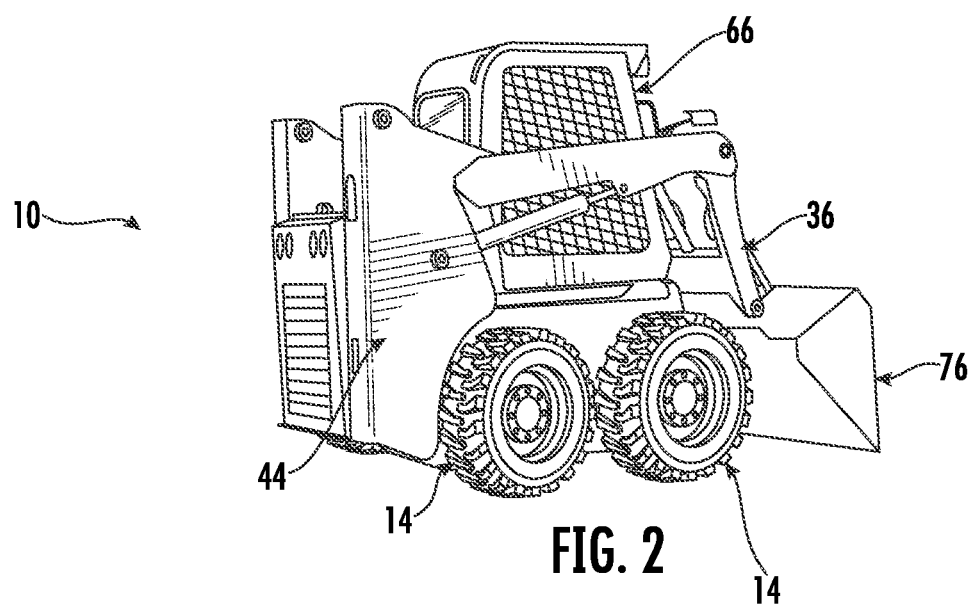
FIG. 2 is a side perspective view of an electric loader of the type shown in FIG. 1, with the bucket attached.
Figure 4:
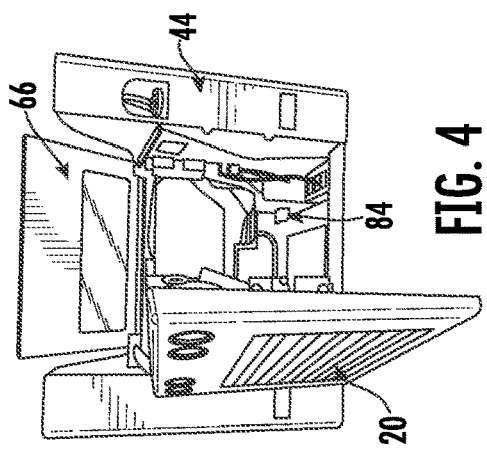
FIG. 4 is a back perspective view of the electric loader of FIG. 1 showing an open back panel door, according to an exemplary embodiment.
Figure 3:
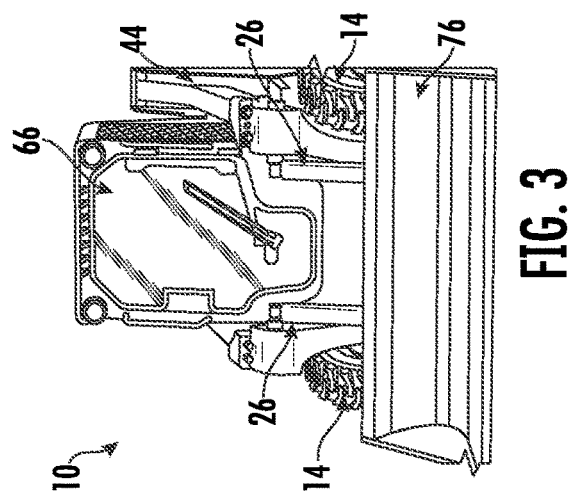
FIG. 3 is a front perspective view of the electric loader of FIG. 1.

FIGS. 1 and 2 are side perspective views of an electric loader 10. FIGS. 3 and 4 are front and back perspective views of electric loader 10. As shown in FIGS. 1-5, electric loader 10 has an external drive such as tracks 12 (FIG. 5) or wheels 14 that can be individually powered by an electric motor 16. In some embodiments, a plurality of electric motors 16 may be coupled or chained to operate in the same function, for example, two electric motors 16 turn at equal RPM to drive a track 12. In other embodiments, each electric motor 16 is driven independently. In this configuration, electric loader 10 can use a central processor to control each wheel 14. In some embodiments, a back access panel or backdoor 20 protects a power supply or battery panel 22 housing individual battery cells 24. Placing battery panel 22 in a rear part of electric loader 10 serves as a counterweight or ballast for a loading arm or loader arm 26 and/or bucket used to lift and/or move a load.

In some embodiments, the processor is coupled to each electric motor 16 and/or wheel 14 independently to enhance the operation and efficiency of electric loader 10 and/or reduce slip. For example, the processor allows an operator to select from a variety of drive modes. Each drive mode is selected independent of wheel 14 and/or tread 28. Specifically, an operator selects from traction control drive modes; such as rock, four-wheel, locked front or rear differential, snow, lawn, concrete, low tire wear, speed, and/or slope. User selection of appropriate drive modes enhances the user experience. For example, a drive mode that reduces slip on a lawn prevents wheels 14 from spinning and tearing up grass in the environment.

Similarly, independent control of each wheel 14 enhances electric loader 10 operation in snow, mud, ice, and other slip environments. The processor may be used to manually control electric motor 16 on each wheel 14 to reduce slip and improve traction in these environments. For example, electric loader 10 has lower tire wear to prolong tread 28 or may have a concrete mode for efficient non-slip operation on level paved surfaces.

The processor may include various sensors 30 to detect slipping at each wheel 14. In some embodiments, when signals from sensor 30 detect slipping the processor can reduce power to an affected wheel 14 (e.g., independently of the power delivered to other wheels 14) to reduce and/or eliminate the slip. Similar learning processes may be used to program the processor. For example, repeated passes over a sloped environment traditionally require an operator to countersteer against the slope to drive in a straight line. Similarly, wind, and unbalanced load, and/or other environmental effects may require an operator to countersteer to drive a conventional loader. In some embodiments, sensors 30 can detect wind, unbalanced loads, and/or slope changes while operating electric loader 10 and compensate the power delivered to each wheel 14 to reduce or eliminate the required operator input. In other words, an operator can drive straight (e.g., without any offset) along a base of a hill or other slope. Similarly, a load sensor 30 on a bucket of electric loader 10 can detect an unbalanced load, and the processor can automatically scale power to electric motors 16 coupled directed to each wheel 14 to offset and/or eliminate the environmental pressures. As noted above, in various embodiments, The processor can use sensors to automate control of each wheel 14 independently and/or receive user input to control traction of each wheel 14.

Figure 5:
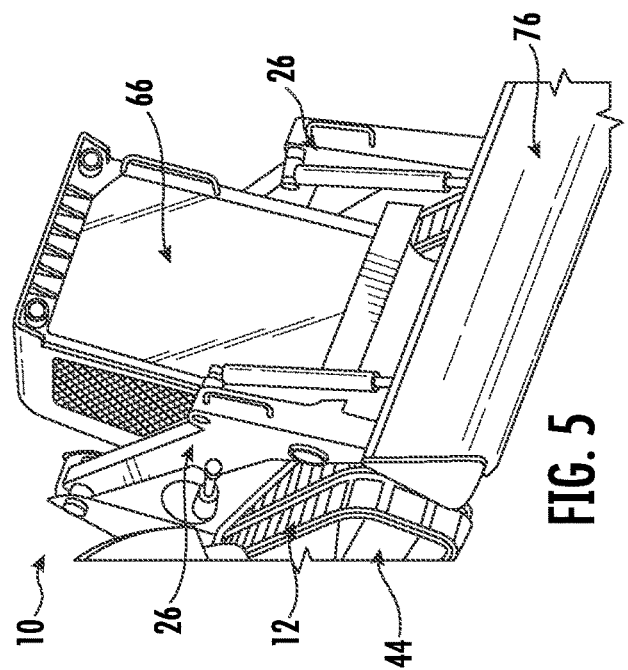
FIG. 5 is a side perspective view of an electric loader driven by tracks, according to an exemplary embodiment.

Electric loader 10 can be a skid steer, track skid, telehandler, lift, forklift, or another loader with lift or loader arm 26. In some embodiments, electric loader 10 has two tracks 12 each driven independently by one or more electric motors 16. In other embodiments, electric loader 10 has an electric motor 16 for each wheel 14, for example, four electric motors 16 drive four wheels 14 independently. In some embodiments, an additional or auxiliary electrical motor 16*a* powers a hydraulic lift and/or auxiliary units coupled to a hydraulic or mechanical accessory unit. In some embodiments, an auxiliary attachment connects directly to auxiliary electric motor 16*a*. As shown in FIG. 5, in some embodiments, electric loader 10 is driven by tracks 12.

Figure 6:
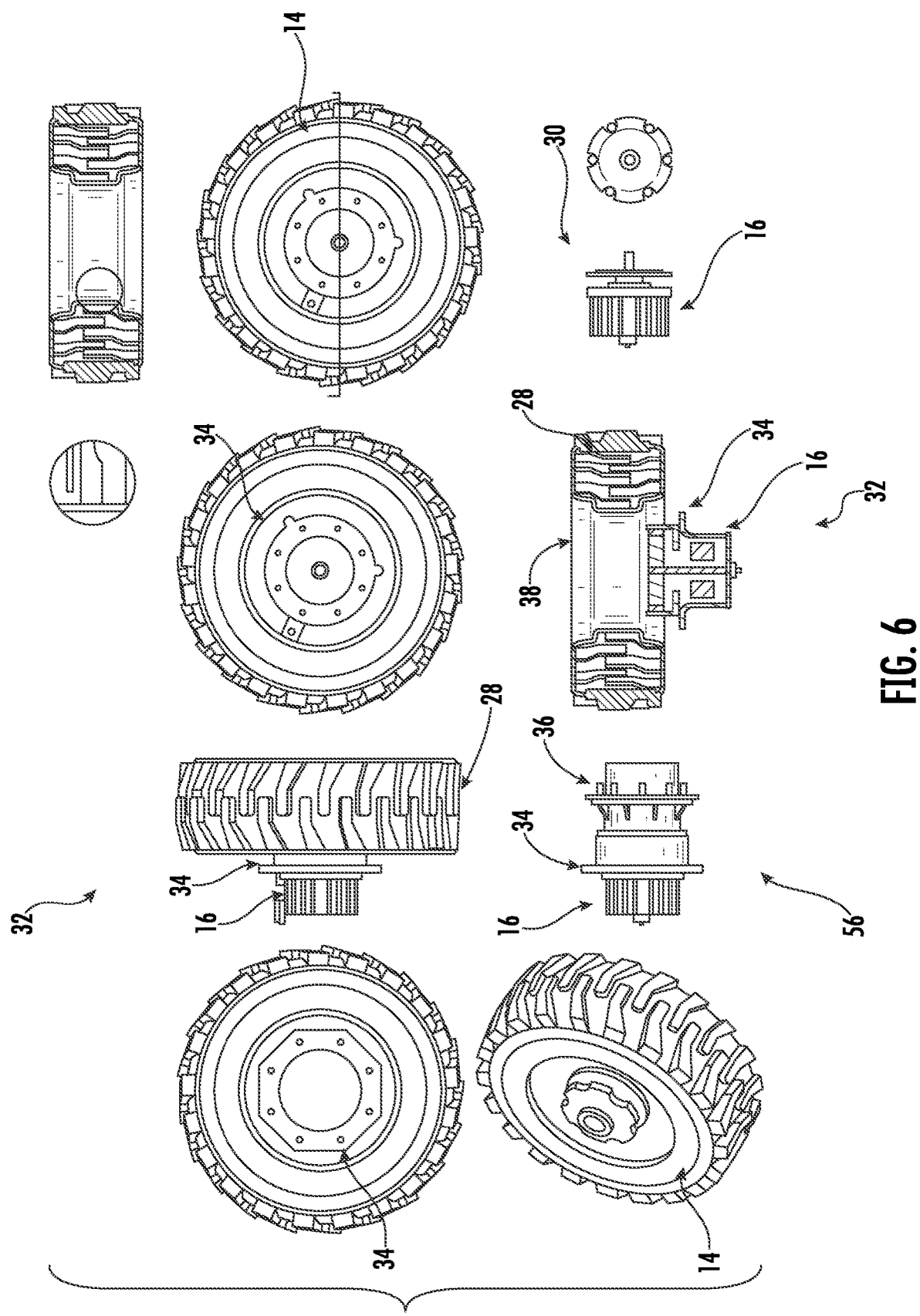
FIG. 6 includes view of an electric wheel assembly configured to receive an electric motor, according to an exemplary embodiment.

FIG. 6 shows an electric wheel assembly 32 that has a wheel 14 with a tread 28, a fixed hub 34, an electric motor 16, a gear reducer 36, and an internal or rotating hub 38 of wheel 14. In a preferred embodiment, gear reducer 36 is an elliptical or planetary gear set wheel end. In this preferred embodiment, such a wheel end would have a torque multiplier in the range of 60 to 100, but the torque multiplier would be selected based upon motor torque and power, desired loader speed range, and desired loader tractive effort.

Electric wheel assembly 32 receives electric motor 16 within wheel 14. In other words, electric wheel assembly 32 includes a motor 16 directly coupled to a gear reducer 36 directly coupled to a wheel 14. In this configuration, electric wheel assembly 32 is individually controlled (e.g., by a central the processor) to independently control the rotation of each wheel 14 on electric loader 10. As described above, individual control of electric motors 16 improves traction at each wheel 14. Additionally, the system enhances operator control of traction modes, e.g., automatically through a feedback loop between sensor 30, local controller 40, the processor, and electric motor 16 and/or through operator inputs related to the working environment. In some embodiments, local controller 40 is the processor.

In various embodiments, gear reducer 36 replaces a conventional chain-case 42 to transform the output of electric motor 16 to control the torque and/or speed at wheel 14. For example, gear reducer 36 is a planetary gear reduction inside a rotating hub 38 of wheel 14. In various embodiments, gear reducer 36 may have between 150:1 to 40:1 torque reduction, specifically, between 110:1 to 50:1, specifically between 100:1 and 60:1 and, more specifically, between 80:1 and 60:1. In various embodiments, each battery cell supplies a 48V to 72V potential charge and is recharged with a 120V to 220V charge. For example, a 48V potential with 100A current at each wheel 14 provides for a 4.8 kW of electric power for electric motor 16 at each wheel 14. In various embodiments, at least 4.0 kW of electric power for the electric motor 16 is provided for at each wheel 14, specifically, at least 6.0 kW, and more specifically at least 8.0 kW. In a specific embodiment, at least 10 kW of electric power is provided to each electric motor 16 independently coupled to each wheel 14.

Independent control of electric motors 16 at each wheel 14 enhances steering and other benefits. Specifically, independent control of wheels 14 enables side shifted wheels 14 on a forklift or other electric loader 10. In some embodiments, electric loader 10 is equipped with a 3-Dimensional or spherical drive wheel 14 to facilitate motion in any direction.

Figure 7:
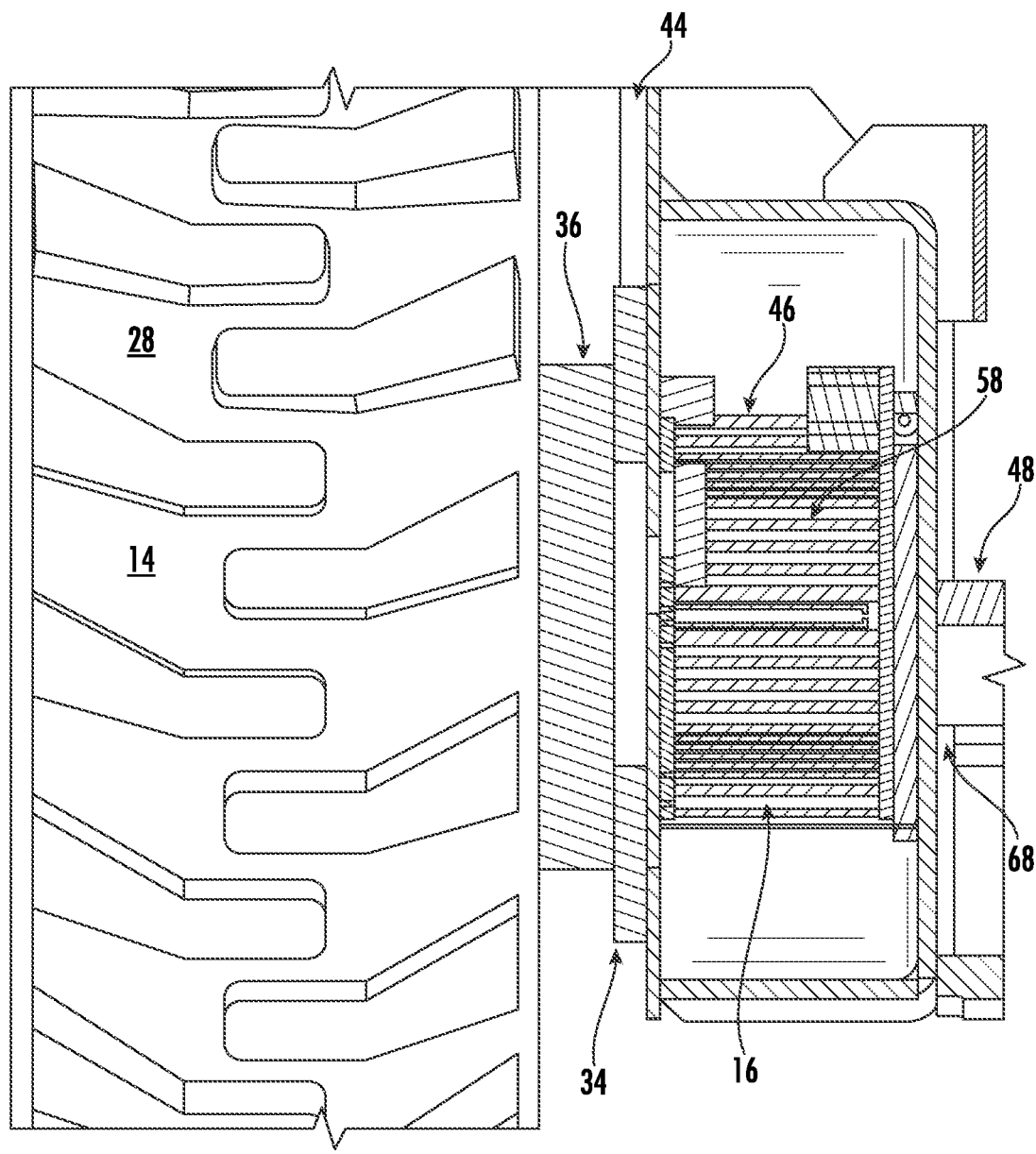
FIG. 7 is a top view of the electric wheel assembly of FIG. 6 showing an installed motor coupled to an independently driven wheel, according to an exemplary embodiment.

FIG. 7 is a top view of the electric wheel assembly 32, shown in FIG. 6. As shown in FIG. 7, electric motor 16 is installed within a cavity of exterior body 44 of electric loader 10 and directly couples to an independently driven wheel 14, such that electric motor 16 is the source of power that controls wheel 14. In other words, there is a 1:1 relationship between electric motor 16 and wheel 14 such that the processor controls each electric motor 16 to control the drive or rotation (e.g., RPM) of each wheel 14 on electric loader 10. FIG. 7 shows a motor housing or cover 46 that surrounds electric motor 16, and a duct 48. In some embodiments, duct 48 supplies forced-air to help cool electric coils on electric motor 16. In some embodiments, a rotor 50 further includes a cooling fan such that the forced-air is returned over the coils 52 on both stator 54 and/or rotor 50 to help maintain the temperature of the electric motor 16.

Figure 8:
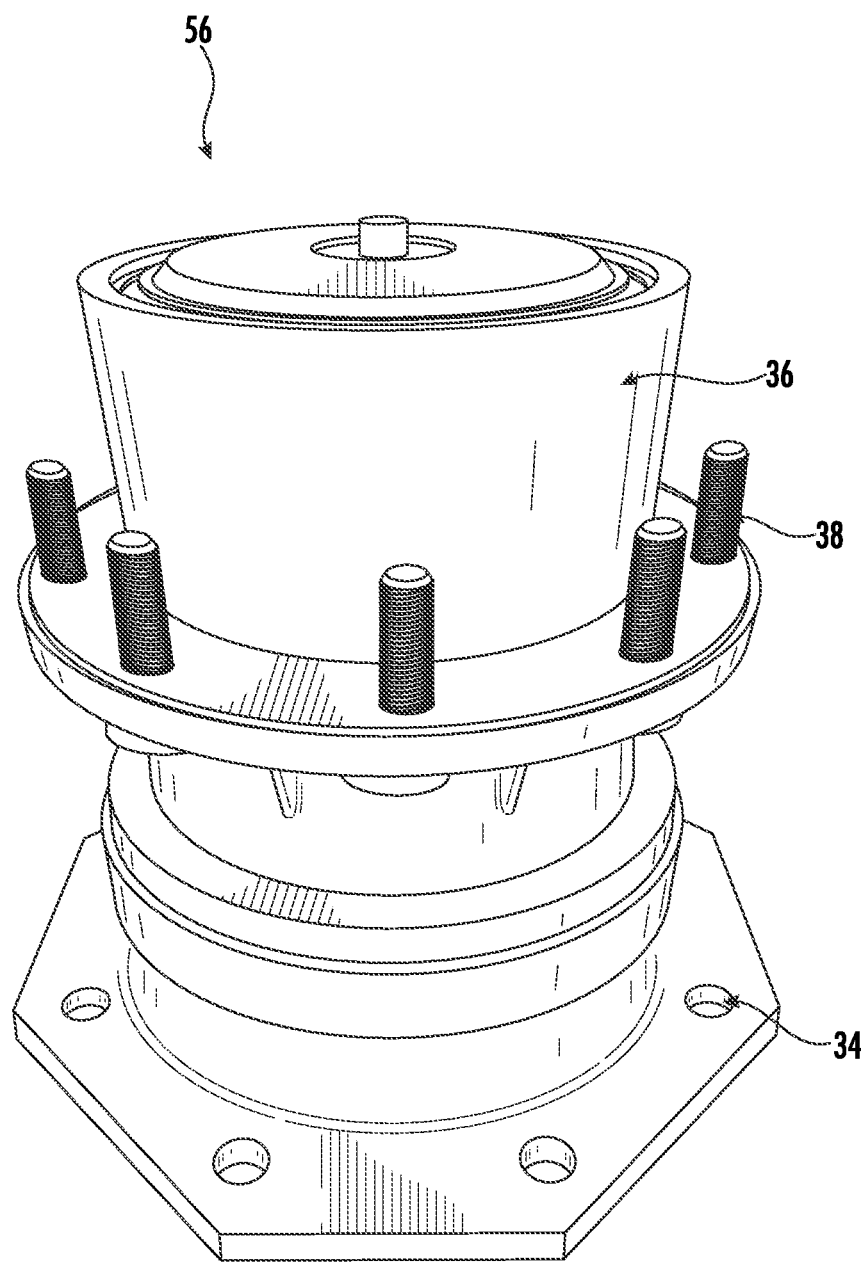
FIG. 8 is a hub that includes a wheel end gear drive, according to an exemplary embodiment.

FIG. 8 is a hub that includes a wheel-end gear or drive gear reducer 36. FIG. 8 shows the hub assembly of FIG. 8, coupled to an electric motor 16 to form an electric motor-hub assembly 56. FIG. 8 shows a cover 46 surrounding electric motor 16 for forced-air venting to cool coils 52 of electric motor 16 during operation. In various embodiments, cover 46 includes fins 58 to radiate off waste heat. With reference to FIG. 8 stationary or fixed hub 34 couples to a side body 44 of electric loader 10. Drive gear reducer 36 is coupled to an exterior of electric loader 10 and couples directly to a track 12 or wheel 14. In some embodiments, drive gear reducer 36 is a planetary gear reduction for electric motor to reduce the torque and increase the speed received from electric motor 16. For example, drive gear reducer 36 reduces the torque received from electric motor 16 to increase a speed of rotation (RPM) of wheel 14. In other embodiments, this process is reversed, such that an output speed of electric motor 16 is reduced by drive gear reducer 36 and the output torque at wheel 14 is increased. FIG. 8 shows openings in a top part of cover 46. For example, pressurized or forced-air is forced through the top of cover 46 and through electric coils of stator 54 and/or rotor 50 to cool electric motor 16. As shown in FIG. 8, fixed hub 34 couples to a side of body 44 such that electric motor 16 is within body 44 and drive gear reducer 36 extends outside body 44. In some embodiments, the side of body 44 is recessed such that wheels 14 are at least partially covered or surrounded by a portion of body 44.

In some embodiments, electric motor 16 is located in a sealed environment, and heat is transferred from electric motor 16 to a base casting and/or cover 46. Cover 46 includes fins 58 for natural convection of the generated heat away from cover 46. A forced clean air cooling system 60 delivers pressurized clean and/or cool air through stator 54, rotor 50, and/or a gap 62 between stator 54 and/or rotor 50 to remove heat from coils 52 (e.g., copper windings), magnets 64, lamination steel, and/or iron of stator 54 and/or rotor 50. In some embodiments, rotor 50 includes ¾ inch diameter holes for circulating the forced-air. Spacing or gaps 62 between rotor 50, stator 54, and/or coils 52 enables the air to flow from a top of stator 54 to a bottom of stator 54. In various embodiments, gap 62 is between 0.01 inches and 0.09 inches wide, specifically, between 0.02 inches and 0.08 inches, and more specifically about 0.06+/−0.01 inches wide. In this configuration, forced clean cool air contacts magnets and/or a tip of stator teeth, where iron losses are generated. Forced-air escapes out of slots of base casting for supporting electric motor 16 and/or stator 54. For example, the escaping forced-air may be vented into a chain casing which is selectively vented to the interior of cab 66 (e.g., to warm the operator on a cool day) or to the surrounding environment (e.g., outside body 44 of electric loader 10, for example, a hot summer day). In various embodiments, cover 46 includes a 1 inch to 3 inches diameter inlet port 68 for receiving forced-air into electric motor 16, specifically between 1.5 inches and 2.5 inches, and more specifically, 1.75 inches to 2.25 inches. In some embodiments, the forced-air is controlled by the processor and uses a variac or variable voltage AC power supply.

Figure 9:
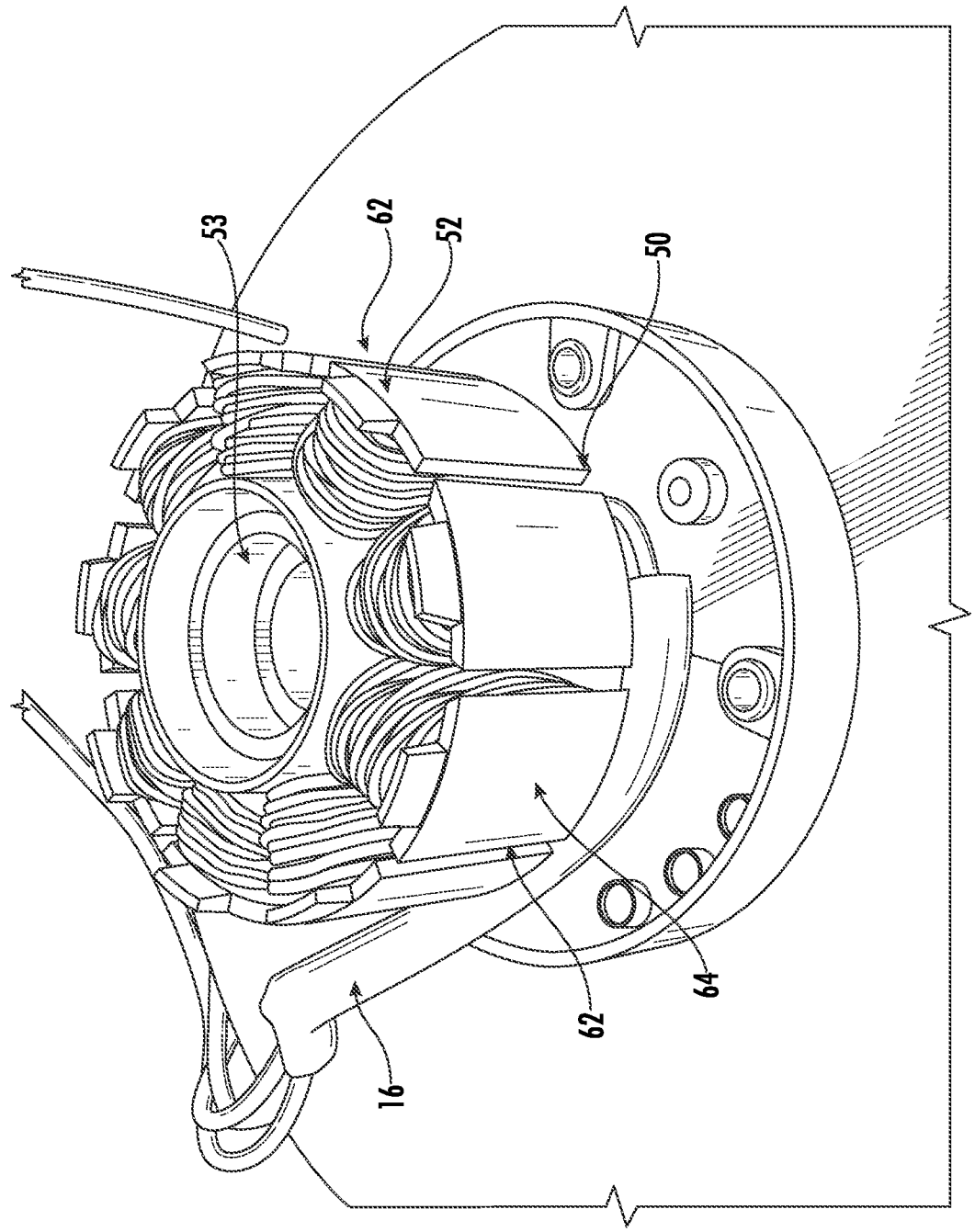
FIG. 9 is an electric motor showing a rotor, a stator, windings, and gaps, according to an exemplary embodiment.
Figure 10:
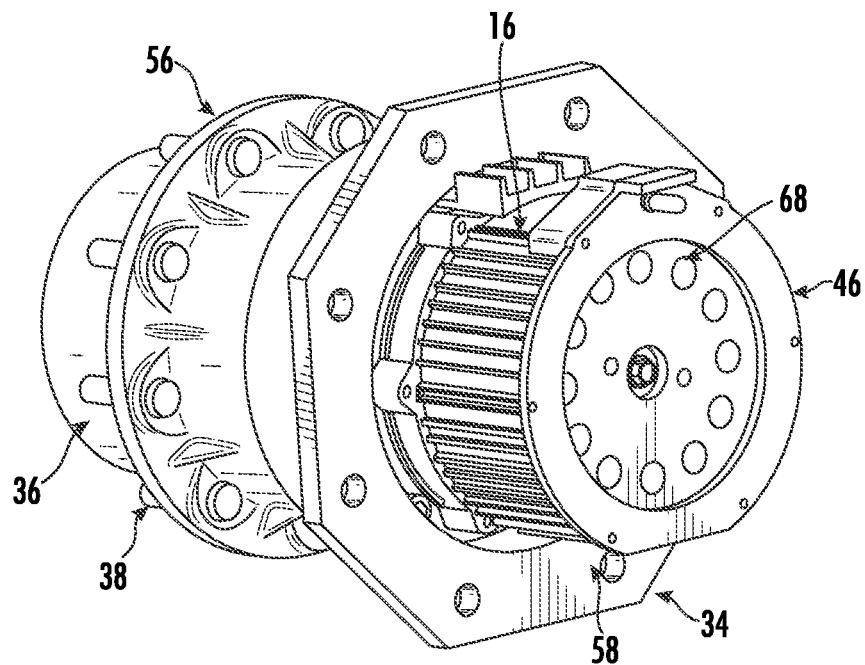
FIG. 10 is an electric motor-hub assembly showing a filter for forced-air venting, according to an exemplary embodiment.

FIG. 9 shows electric motor 16 with rotor 50, coils 52, stator 54, and gaps 62. FIG. 10 is an electric motor-hub assembly showing a filter for forced-air venting, according to an exemplary embodiment. FIG. 9 shows an axial bore 53, through which axle 55 (FIG. 24) of electric motor 16 couples to gear reducer 36 and wheel 14.

Figure 11:
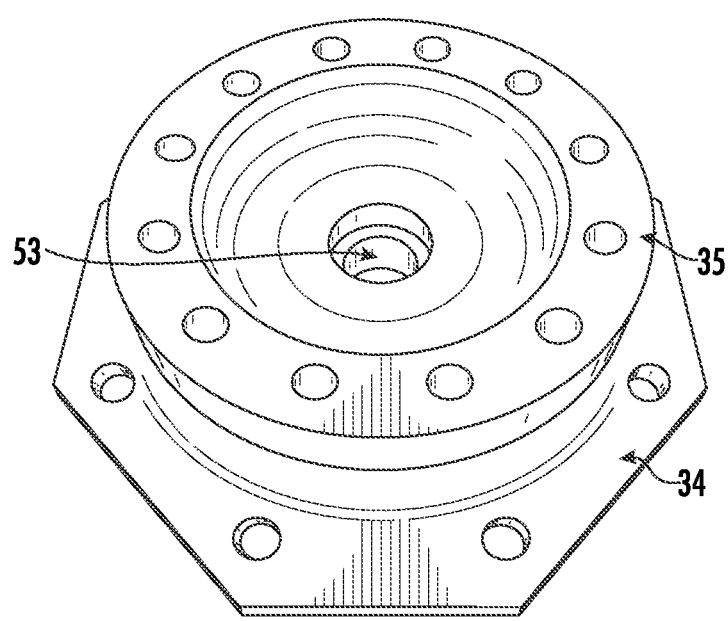
FIG. 11 is a fixed hub connection for attaching the wheel end gear drive of FIG. 8 to a body of the electric loader, according to an exemplary embodiment.
Figure 12:
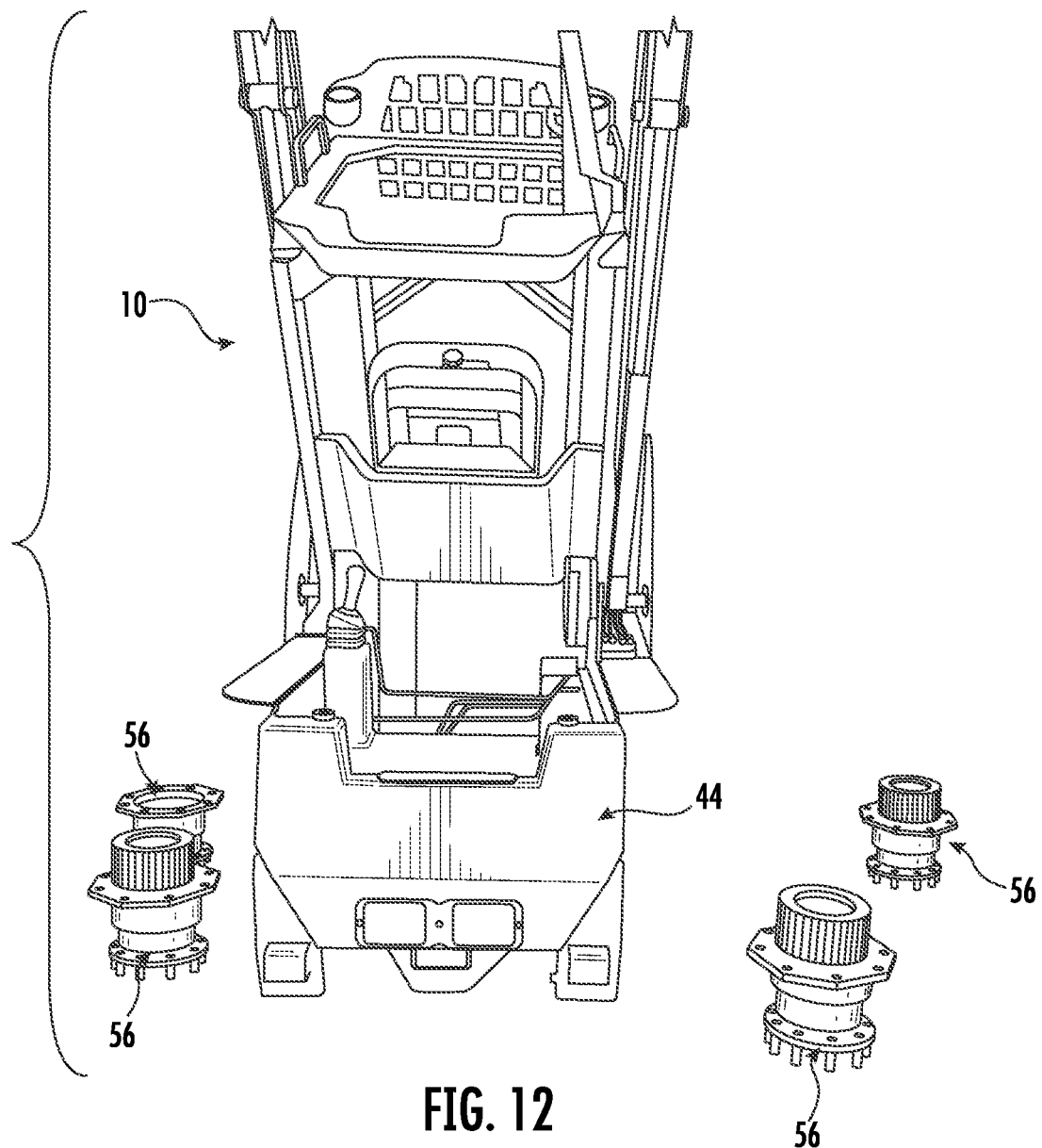
FIG. 12 is an electric loader with four independent motor assemblies (un-installed) for independently driving tracks or wheels at each electric motor-hub assembly, according to an exemplary embodiment.

FIG. 11 shows a fixed hub 34 on an attachment plate 35. Attachment plate 35 provides fixed connection points for attaching or coupling drive gear reducer 36 (e.g., the planetary gear system shown in FIG. 8) to a side body 44 of electric loader 10. FIG. 11 also includes axial bore 53 in a center that receives axle 55 (FIG. 24) of electric motor 16. FIG. 12 shows body 44 of electric loader 10 with four independent electric motor-hub assemblies 56 for independently driving tracks 12 or wheels 14 at each electric motor-hub assembly 56. For example, a single electric motor 16 powers a single track 12 on each side of body 44 with one or more followers or unpowered pivot locations. Alternatively, two or more electric motors 16 could be coupled to a single track 12 and configured to operate dependently, such that each electric motor 16 provides the same torque, speed, and/or power to each track 12. As shown in FIG. 11, each electric motor-hub assembly 56 independently powers each wheel 14 of electric loader 10.

Figure 13:
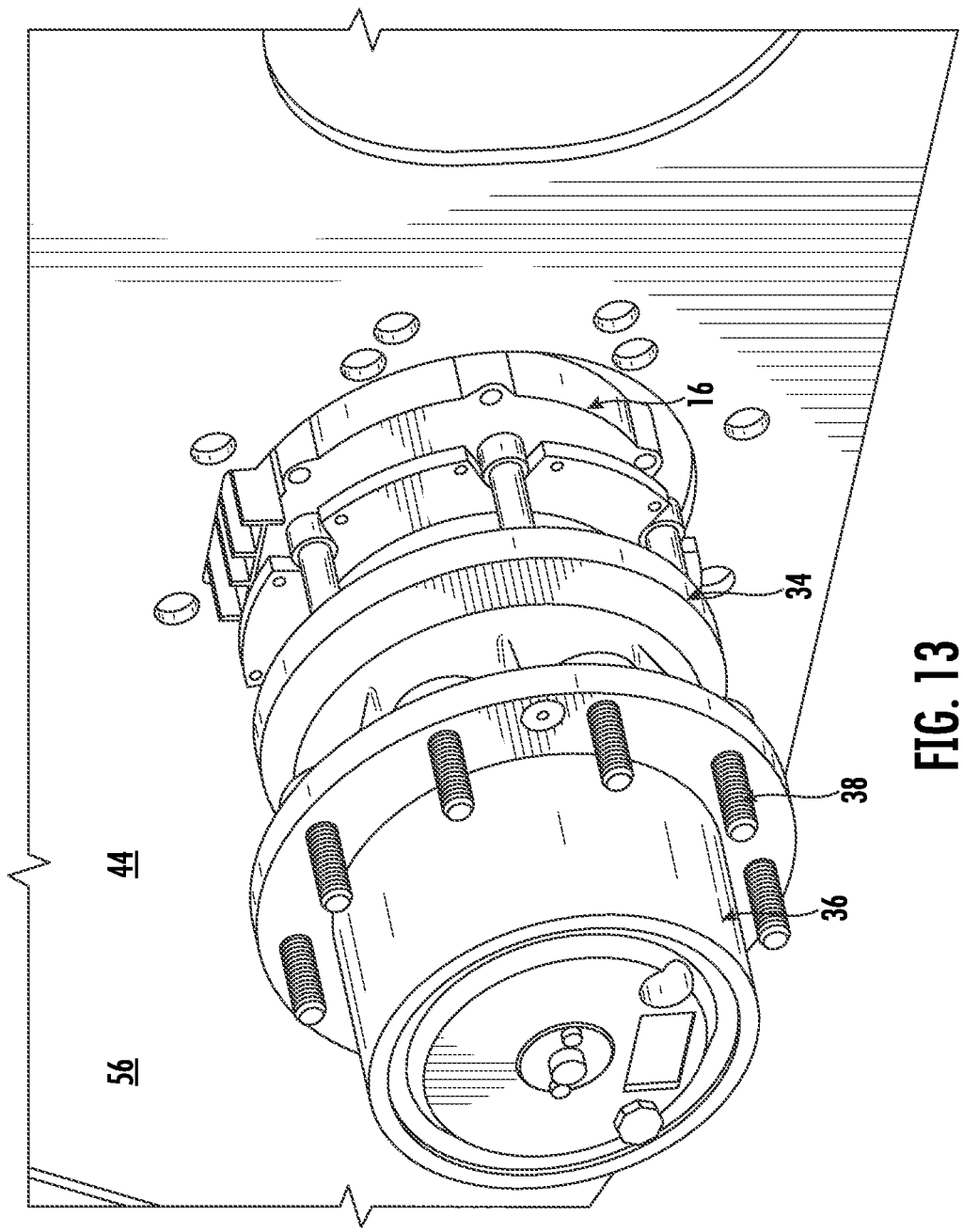
FIG. 13 is a side view of a gear drive for powering a hub of a track or wheel, according to an exemplary embodiment.
Figure 14:
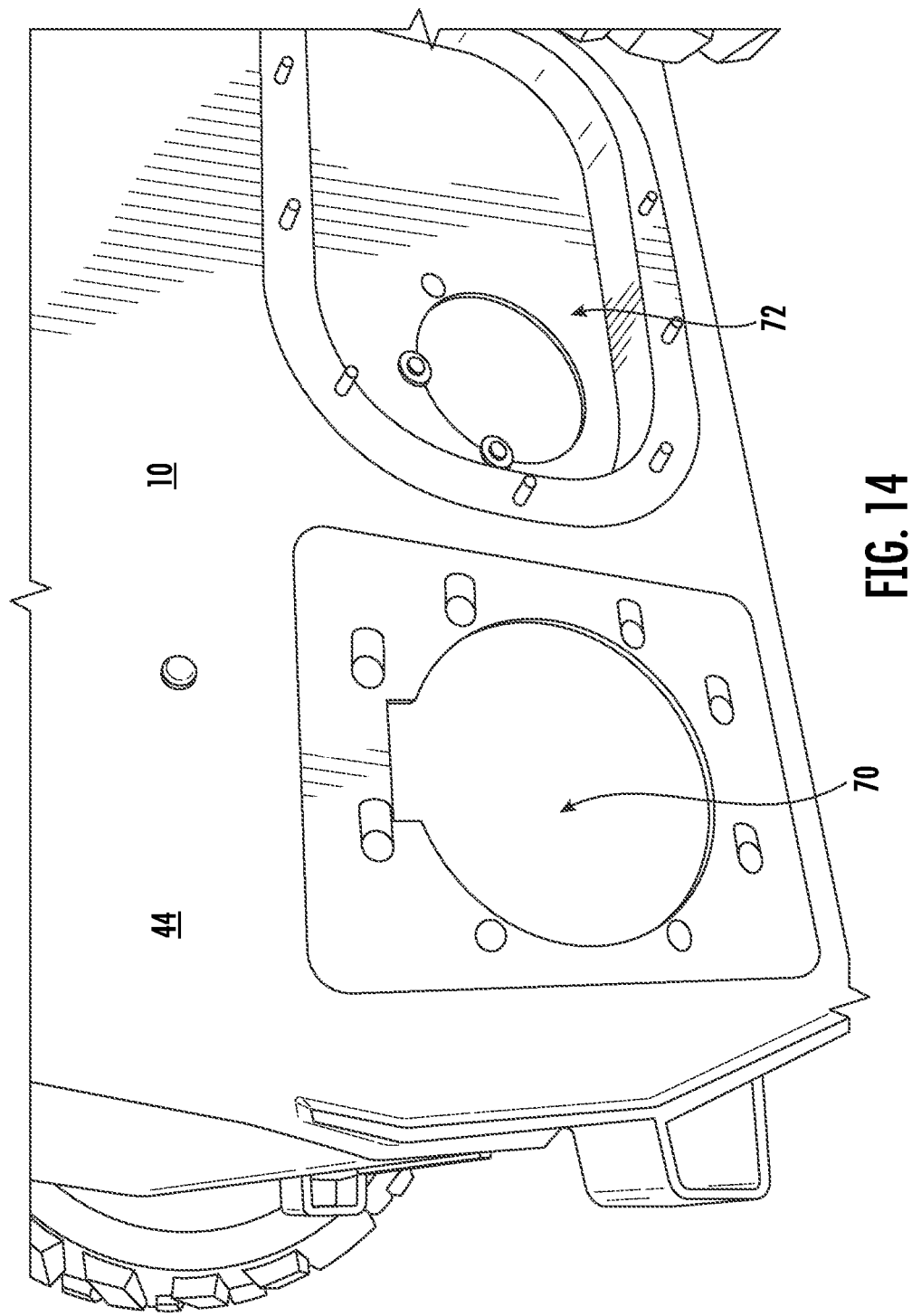
FIG. 14 is a side view of an electric loader that includes a port for receiving the electric motor-hub assembly of FIG. 8 and a control port to facilitate the connection of wiring to an associated electric drive motor.

FIGS. 13 to 17 show various stages of the coupling of electric motor-hub assembly 56 to side of body 44. Specifically, FIG. 13 shows a side view of a gear reducer 36 extending from the side of body 44. Drive gear reducer 36 powers a rotating hub 38 of a track 12 or wheel 14. FIG. 14 is a side view of an electric loader 10 that includes a receiving port 70 for receiving electric motor-hub assembly 56 shown in FIG. 8 and also shows a control port 72 for either a general the processor and/or a local processor to control one or more electric motors 16 of electric loader 10. For example, a local processor is assigned to each electric motor 16.

Figure 16:
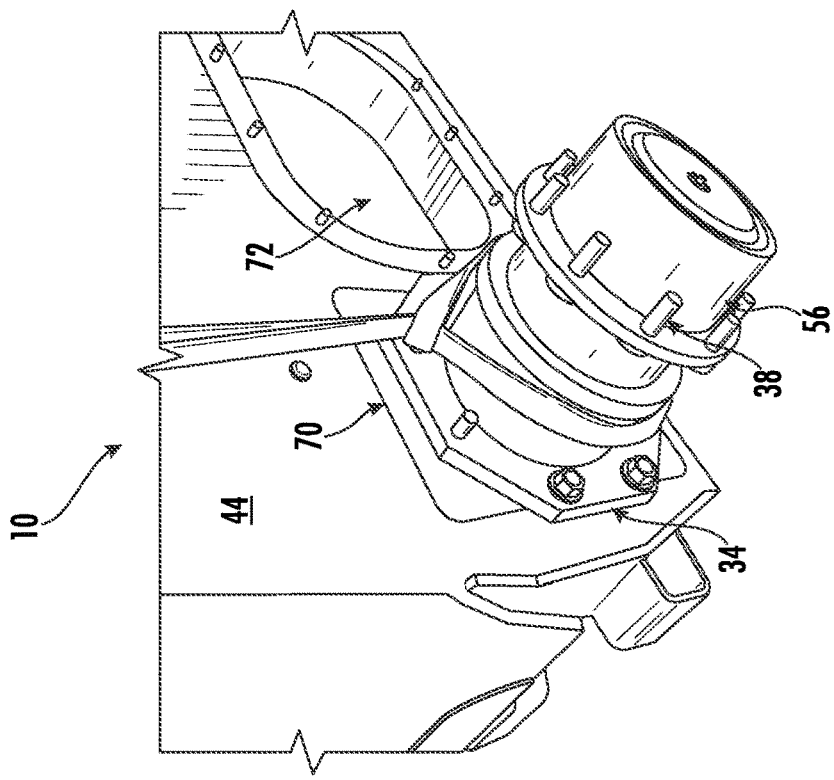
FIG. 16 follows the installation of FIG. 15 to show how the fixed hub is attached to a side of the electric loader to support the installed electric motor-hub assembly.
Figure 15:
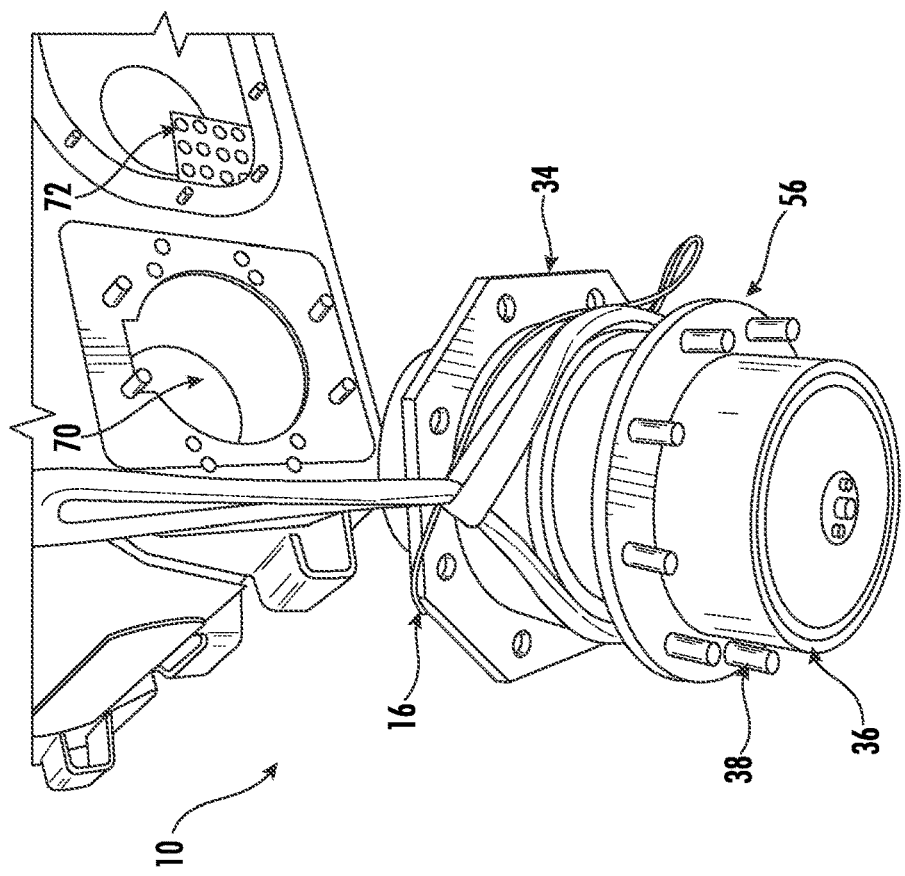
FIG. 15 is a view of an electric motor-hub assembly being coupled to the port of an electric loader.
Figure 17:
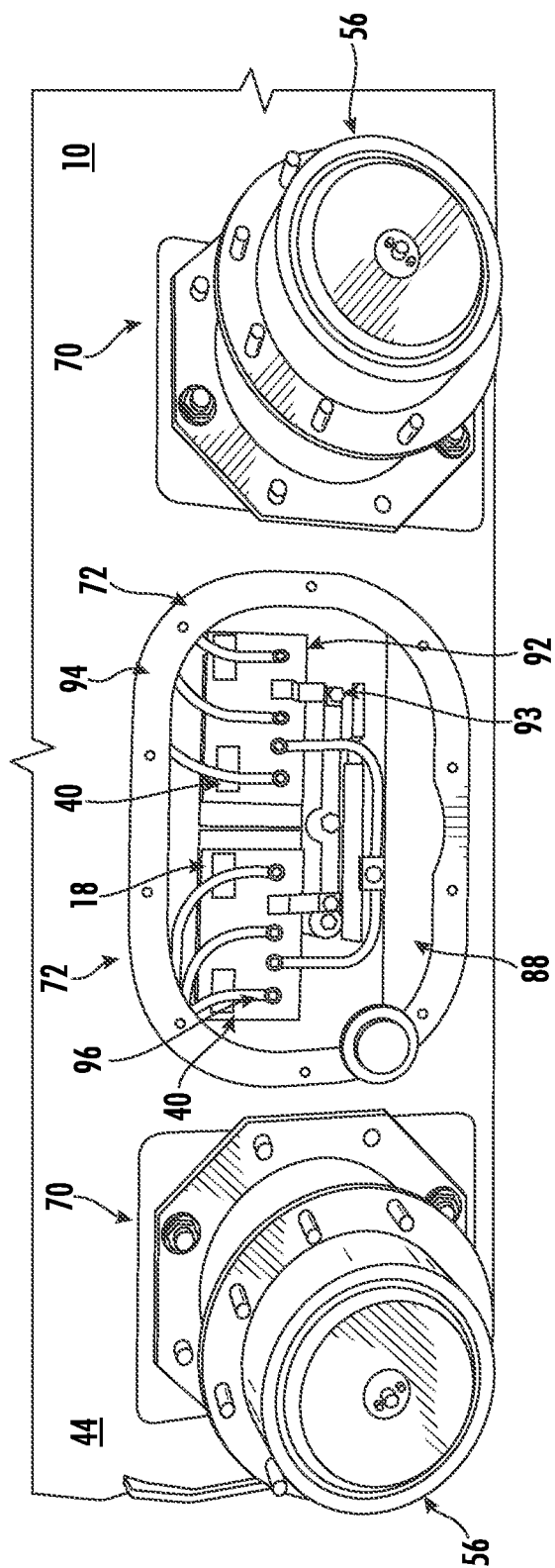
FIG. 17 is a side view of an electric loader with front and rear electric motor-hub assemblies installed and a central control port for connecting each electric motor to a central processor and/or power source or battery pack, according to an exemplary embodiment.

FIG. 15 is a view of electric motor-hub assembly 56 being coupled to receiving port 70 of electric loader 10 or loader. FIG. 16 shows the following step of the installation shown in FIG. 15. Specifically, FIG. 16 shows how fixed hub 34 attaches to body 44 of electric loader 10 to support an installed electric motor-hub assembly 56 and power a wheel 14. For example, the central control port 72 is used to couple electric motor-hub assembly 56 before the processor and/or other electrical connections are made in control port 72. FIG. 17 is a side view of electric loader 10 with an installed front and rear electric motor-hub assemblies 56. A central control port 72 connects each electric motor 16 to a central the processor and/or power source or battery panel 22.

Figure 18:
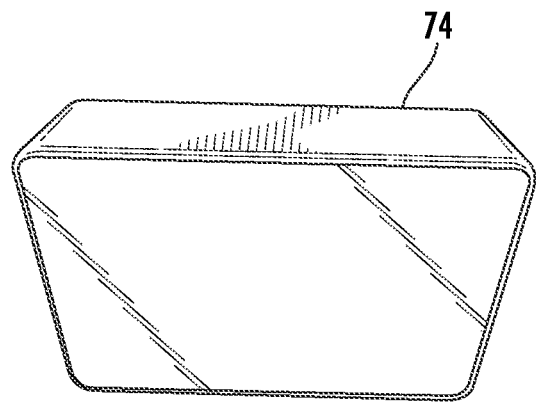
FIG. 18 is an isolated perspective view of a graphical user interface for an operator to interface with a processor and/or control panel, according to an exemplary embodiment.
Figure 19:
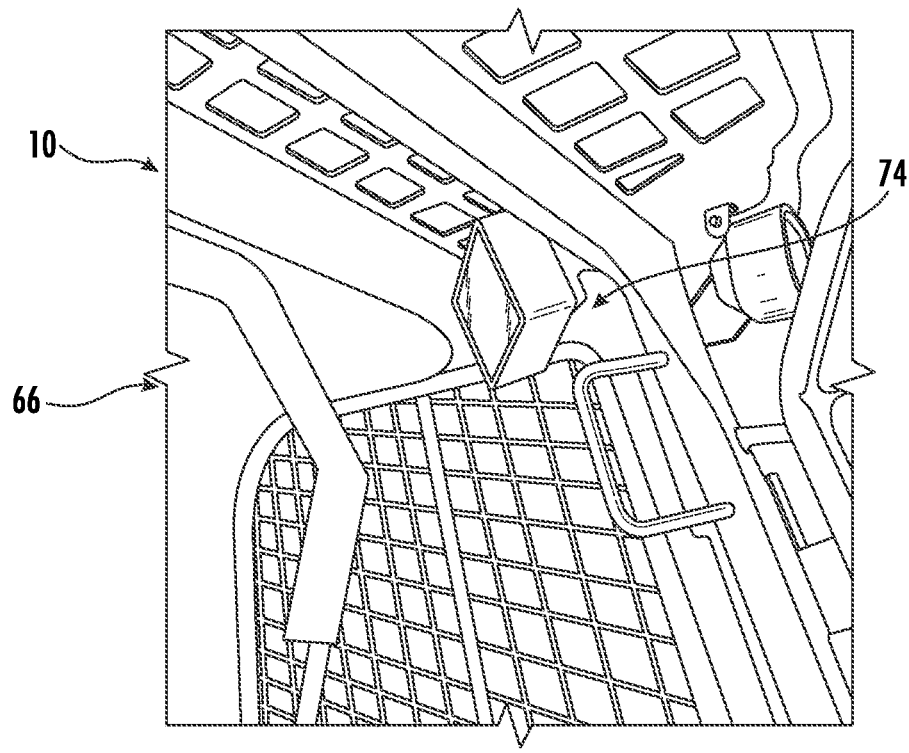
FIG. 19 shows the graphical user interface of FIG. 18 inside a cab of an electric loader, according to an exemplary embodiment.

FIG. 18 is an isolated perspective view of a graphical user interface or a display 74 for an operator to interface with the processor and/or a control panel or controller 40. FIG. 19 shows display 74 inside cab 66 of electric loader 10. In various embodiments, display 74 is a system on a chip (SOC) display 74 that display 74 a parking brake, warning signals, limits the travel of loader arm 26 or arm, shows RPM of one or more electric motors, and/or other system information feedback.

Figure 21:
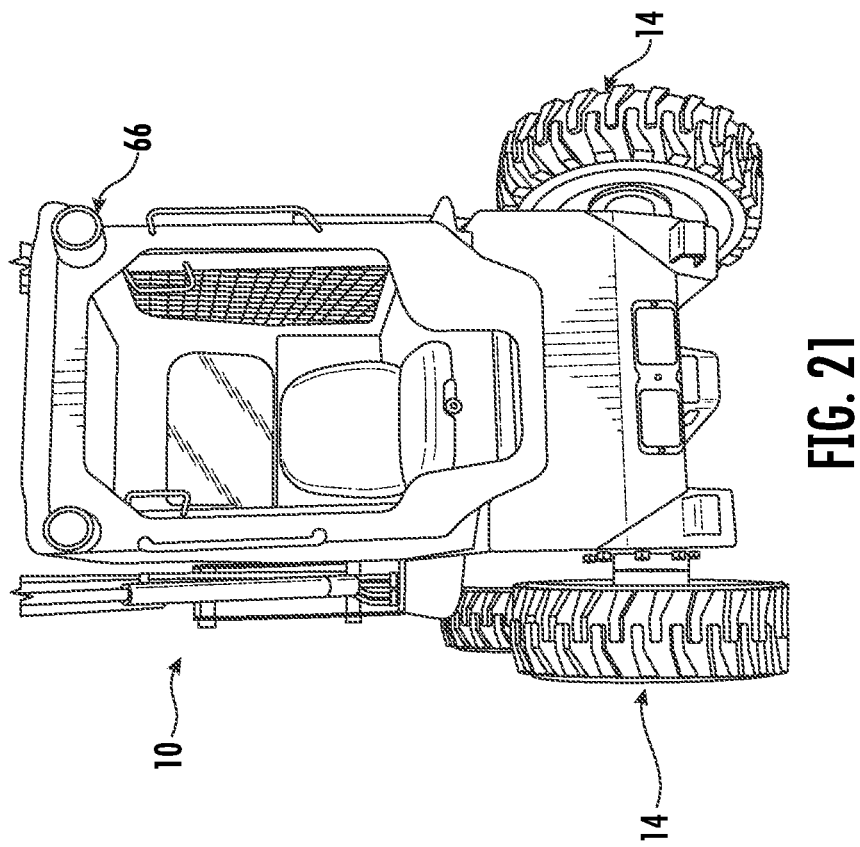
FIG. 21 shows the electric loader of FIG. 20 with four wheels installed at each electric motor-hub assembly.
Figure 20:
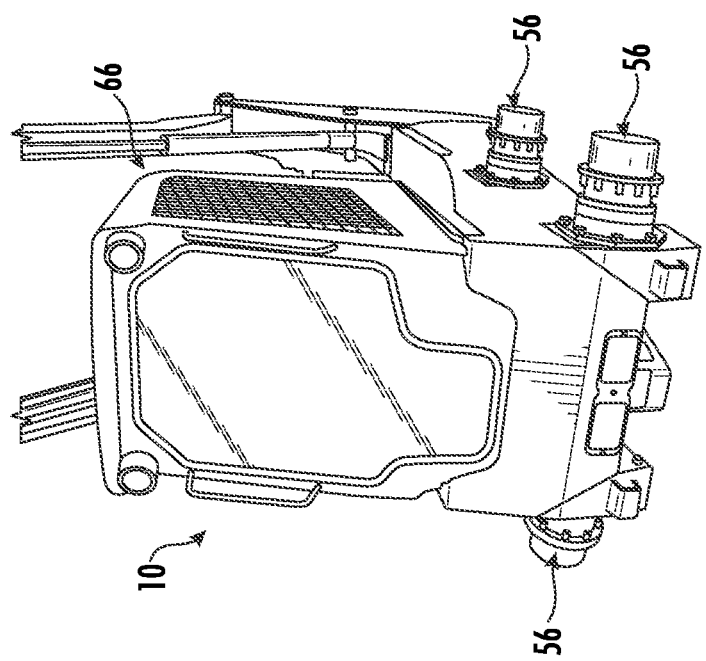
FIG. 20 is an electric loader including four electric motor-hub assemblies to independently drive four-wheel locations, according to an exemplary embodiment.

FIGS. 20 and 21 show the attachment or coupling of wheels 14 to the electric motor-hub assembly 56. Specifically, rotating power hubs 38 couple to standard tracks 12 or wheels 14 to drive and control electric loader 10. FIG. 20 shows electric loader 10 with four electric motor-hub assemblies 56 attached or coupled independently at four-wheel 14 locations. FIG. 21 shows electric loader 10 with four installed wheels 14 at each electric motor-hub assembly 56.

Figure 22:
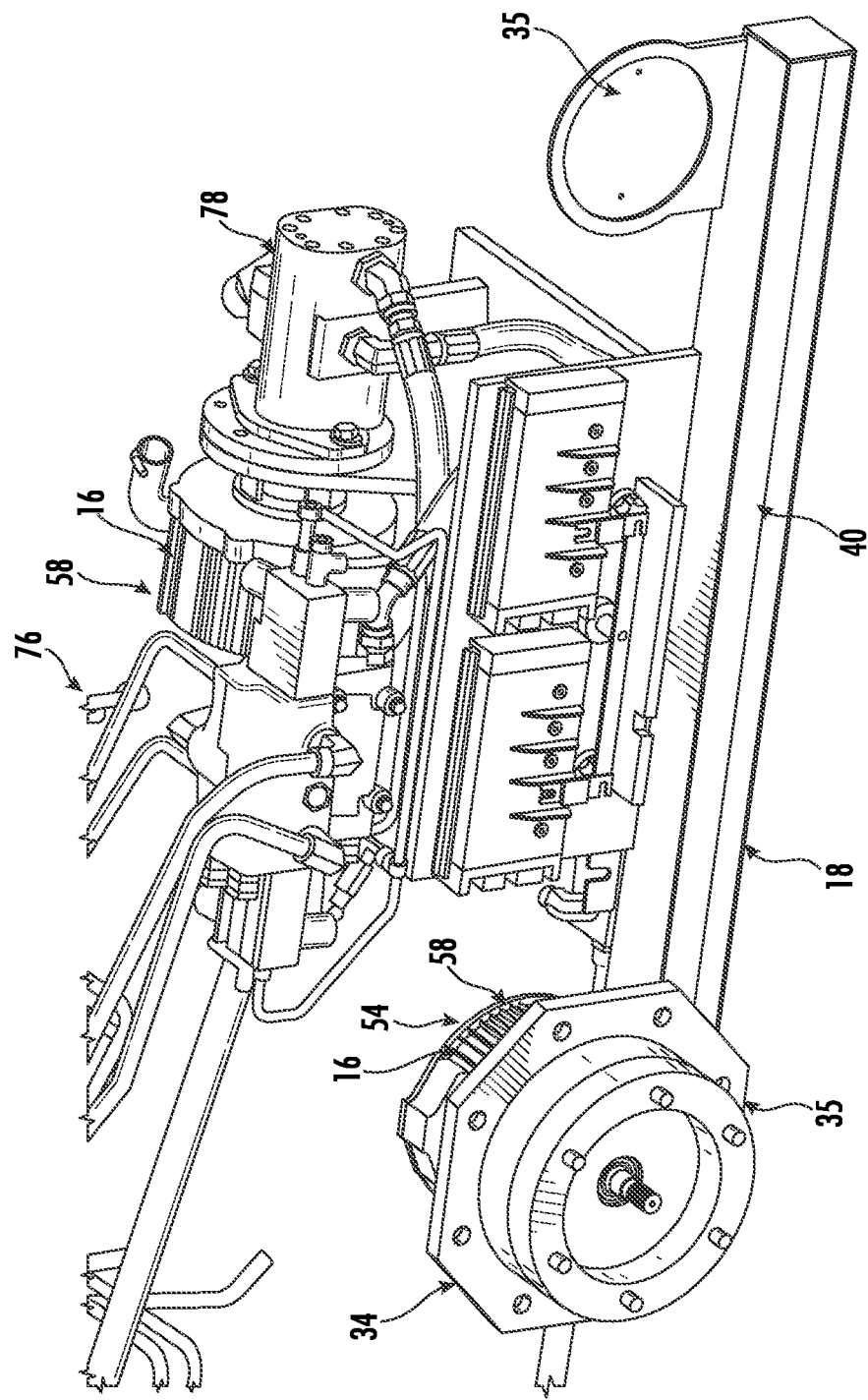
FIG. 22 is an electric motor hydraulic pump assembly to power the hydraulic lift system and one or more hydraulic auxiliary units, according to an exemplary embodiment.

In some embodiments, a dedicated electric motor 16 is used to drive a lift arm assembly or loader arm 26 and/or other accessories or auxiliary units 76. FIG. 22 shows electric motor 16 coupled to a hydraulic assembly or hydraulic 78 that powers a loader arm 26 and/or one or more hydraulic auxiliary units 76. For example, electric motor 16 powers a hydraulic unit to power loader arm 26 and includes additional auxiliary units 76 to power attachments, such as but not limited to a snow-blower, a lawnmower, a wood chipper, a grapple bucket, a pallet fork, a rake, a log splitter, a saw, a bucket, and/or other hydraulic attachments that enhance the functionality of the electric loader 10. In some embodiments, dedicated electric motor 16 may power other systems, such as an air conditioner. Additional auxiliary systems may be hydraulic or convert electric power into mechanical energy.

Figure 23:
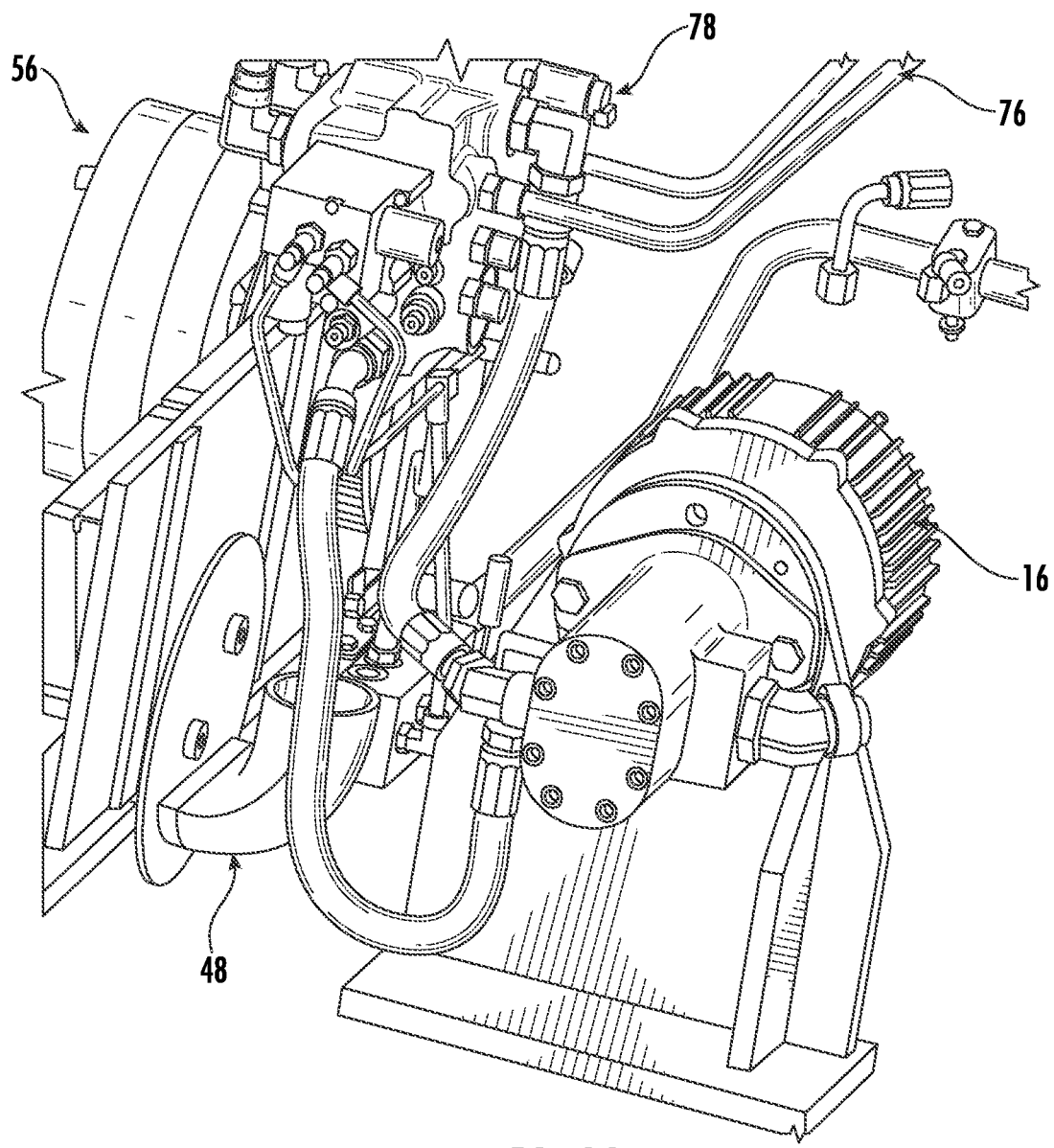
FIG. 23 is a front perspective view of the electric motor hydraulic pump assembly shown in FIG. 22.

FIG. 23 is a front perspective view of the electric motor hydraulic drive assembly shown in FIG. 22. A controller 40 is shown for electric motor 16 coupled to loader arm 26 and hydraulic auxiliary units 76 and/or for electric motor-hub assembly 56. As shown in FIG. 22, electric motor-hub assembly 56 includes a motor mount for a second electric motor-hub assembly 56 located close to dedicated electric motor 16 and coupled to hydraulic auxiliary units 76 and/or loader arm 26. FIG. 23 shows a more isolated view of the dedicated electric motor 16. Also shown are ducting for forced-air cooling of dedicated electric motor 16.

Figure 24:
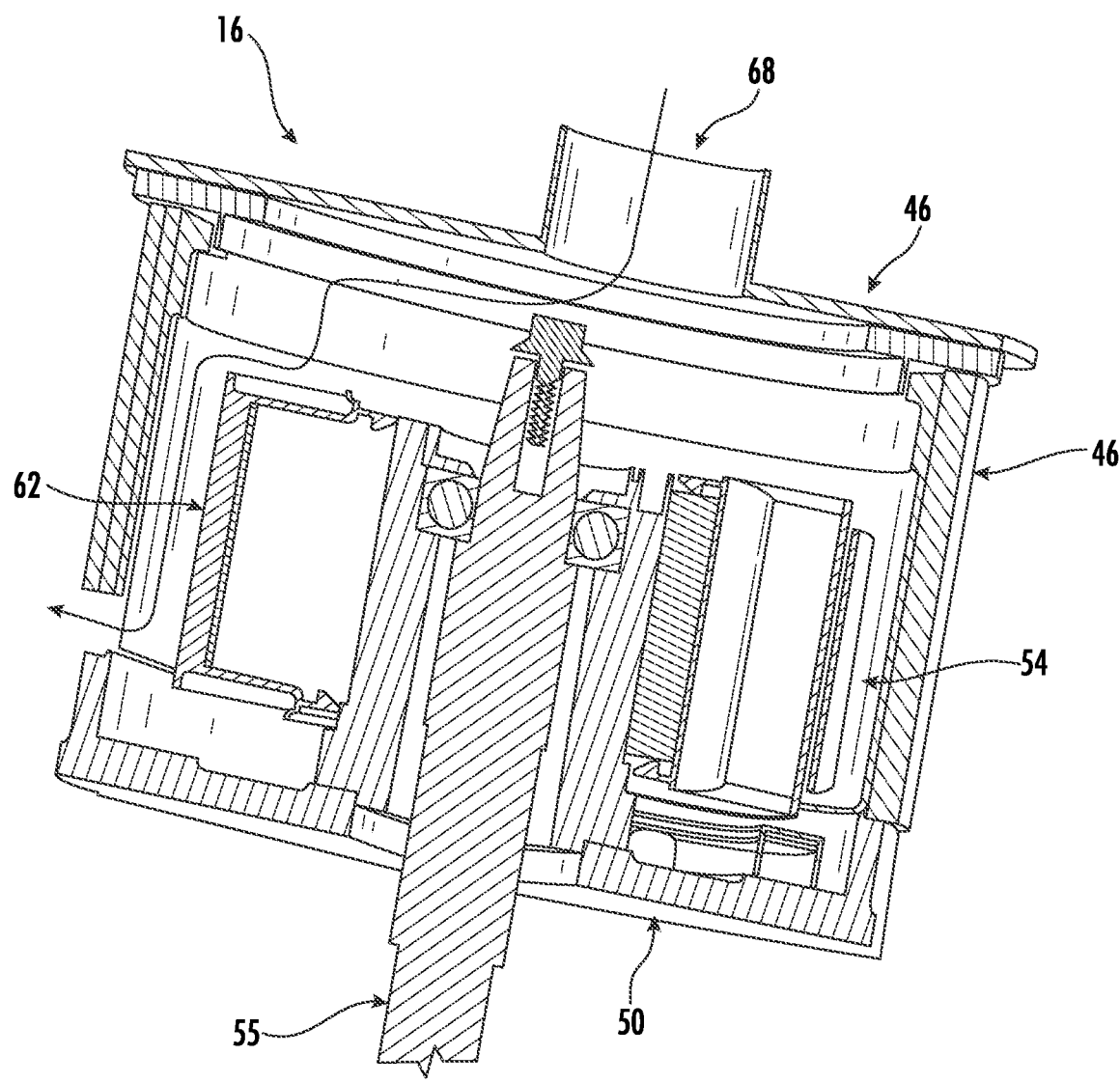
FIG. 24 is a cross-sectional view of an electric motor, including a housing configured to vent forced-air through the electric motor and cool the assembly, according to an exemplary embodiment.

FIG. 24 is a cross-sectional view of an electric motor 16 to show cover 46 and/or housing that vents forced-air through electric motor 16 and cools rotor 50, stator 54, and coils 52.

Figure 27:
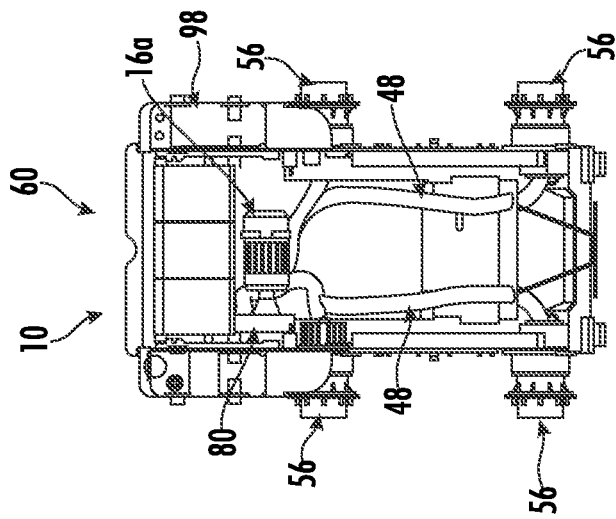
FIG. 27 is a bottom perspective view of the central forced-air system of FIG. 25.
Figure 26:
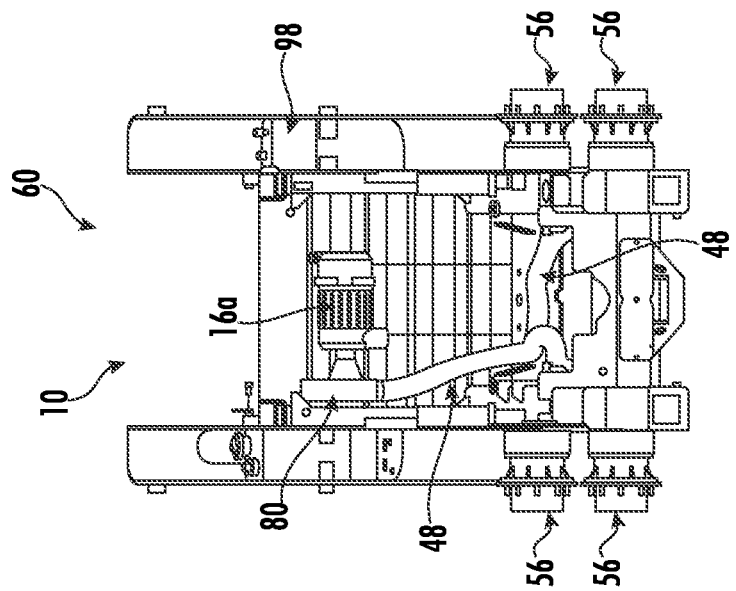
FIG. 26 is a side perspective view of the central forced-air system of FIG. 25.
Figure 25:
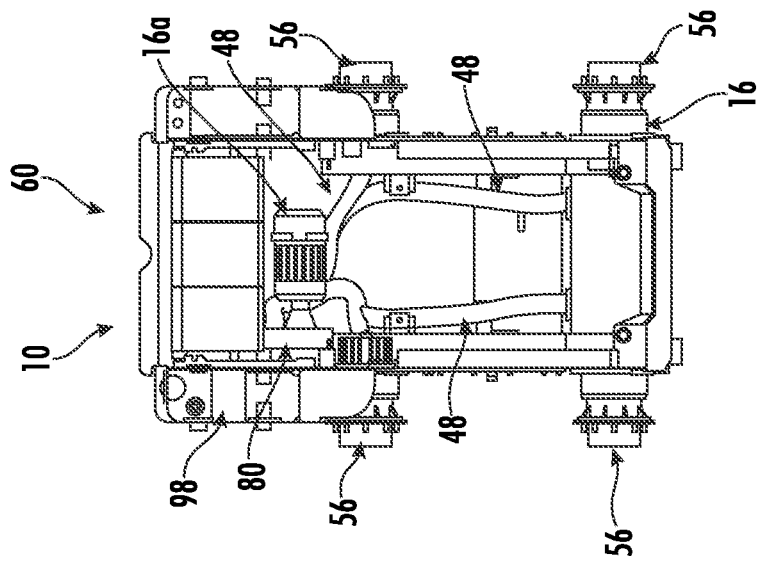
FIG. 25 is a top perspective view of a central forced-air system including an electric motor coupled to a squirrel fan that forces air through a plurality of ducts to each electric motor-hub assembly, according to an exemplary embodiment.
Figure 30:
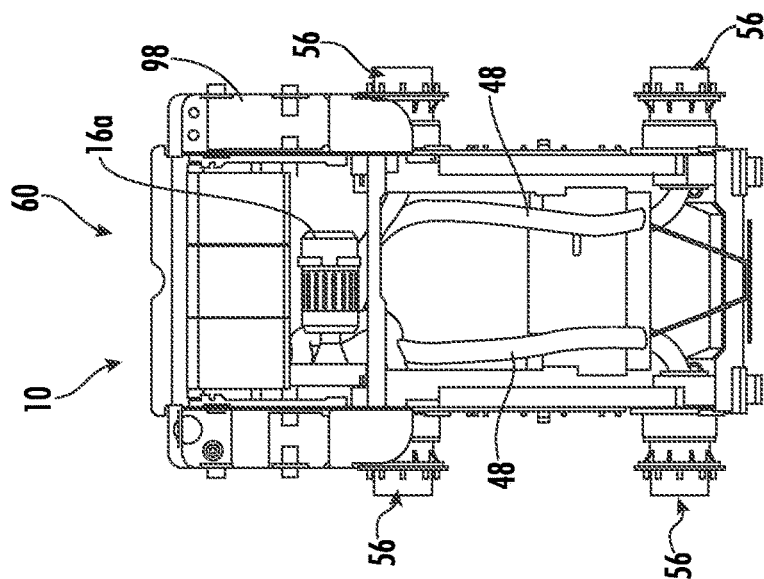
FIG. 30 is a bottom perspective view of the central forced-air system of FIG. 29
Figure 29:
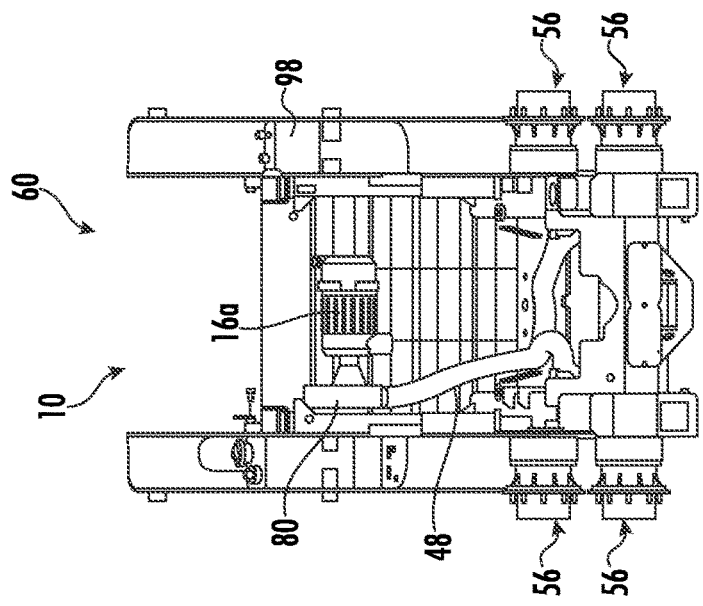
FIG. 29 is a top perspective view of a central forced-air system including an electric motor coupled to a fan that forces air through a plurality of ducts to each electric motor-hub assembly, according to an exemplary embodiment.
Figure 28:
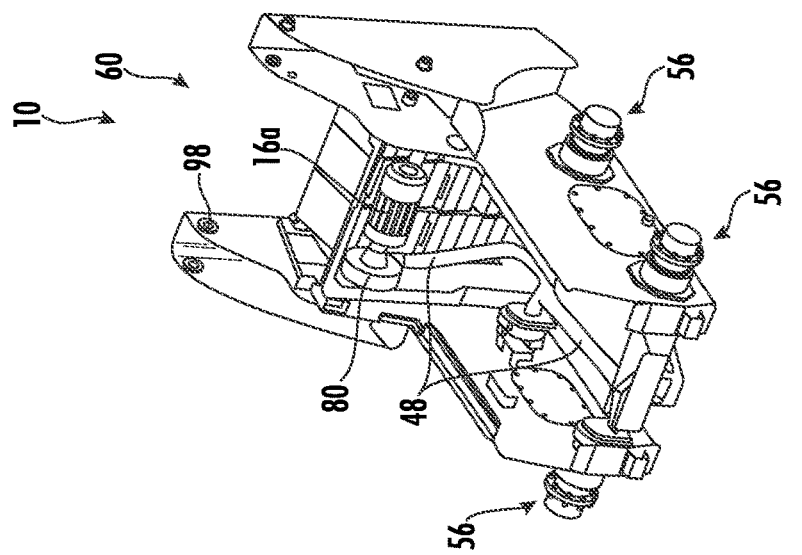
FIG. 28 is a side perspective view of the central forced-air system of FIG. 25.
Figure 33:
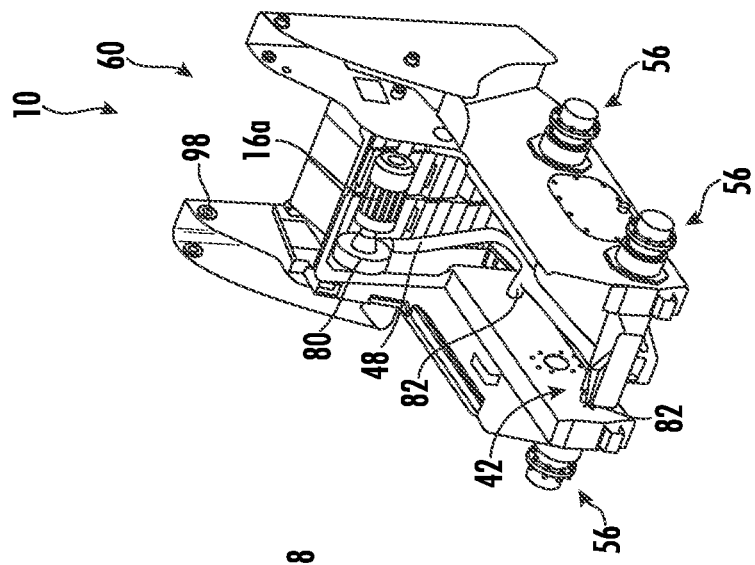
FIG. 33 is a side perspective view of FIG. 29 with the chain-case installed.
Figure 32:
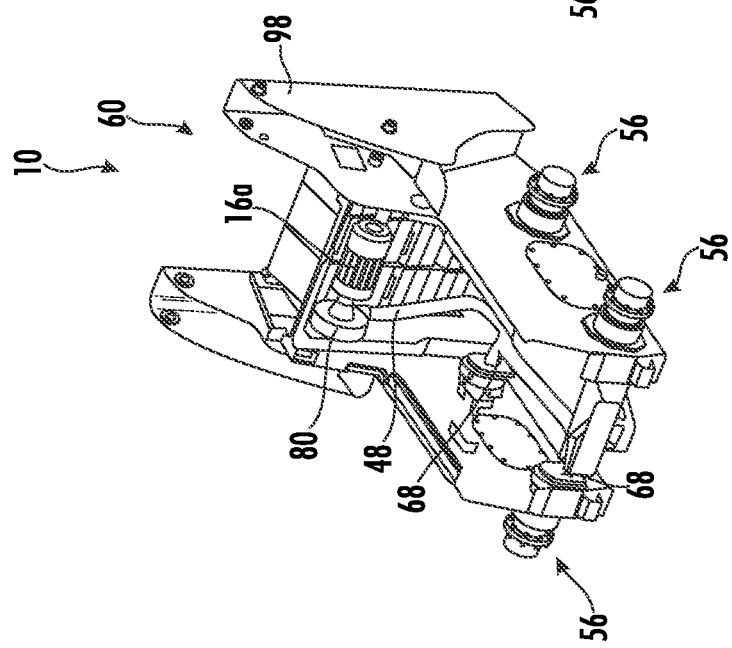
FIG. 32 is a side perspective view of FIG. 29 with a chain-case removed.
Figure 31:
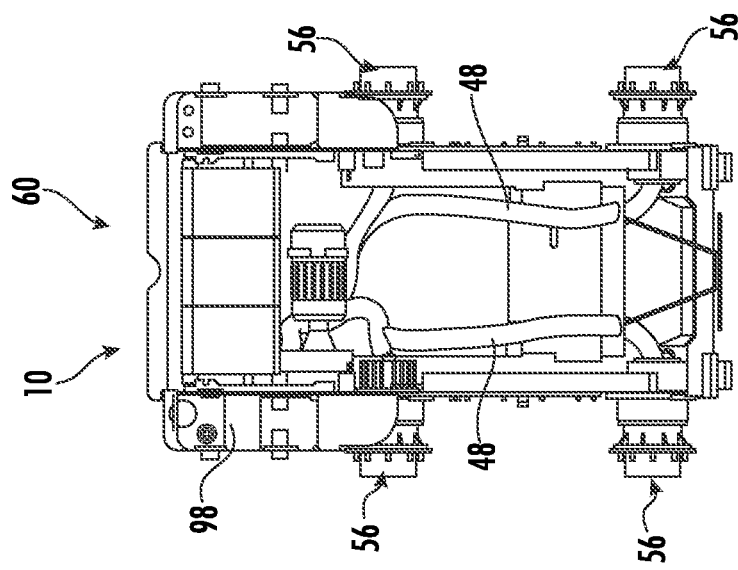
FIG. 31 is a top perspective view of FIG. 29.

FIGS. 25 to 33 show a central forced-air system 60 that has a dedicated electric motor 16 coupled to a squirrel fan 80 to force air through ducts 48 extending to each electric motor-hub assembly 56. FIGS. 26-28 show perspective views of central forced-air system 60. FIG. 29 shows another embodiment of a central forced-air system 60 that includes electric motor 16 coupled to fan 80 that forces air through ducts 48 leading to inlet port 68 on cover 46 of each electric motor-hub assembly 56. FIG. 30 shows a bottom view of central forced-air system 60 and FIG. 31 shows a top view of central forced-air system 60. FIGS. 32 and 33 are side perspective views of central forced-air system 60 with a chain-case 42 removed (FIG. 32) and with the chain-case 42 installed (FIG. 33).

FIG. 34 shows a forced-air cooling duct 48 coupled to cover 46 of electric motor 16 of FIG. 24. Cooling duct 48 forces air through gaps 62 between wound coils 52 of rotor 50, stator 54, and other areas of motor 16.

Figure 35:
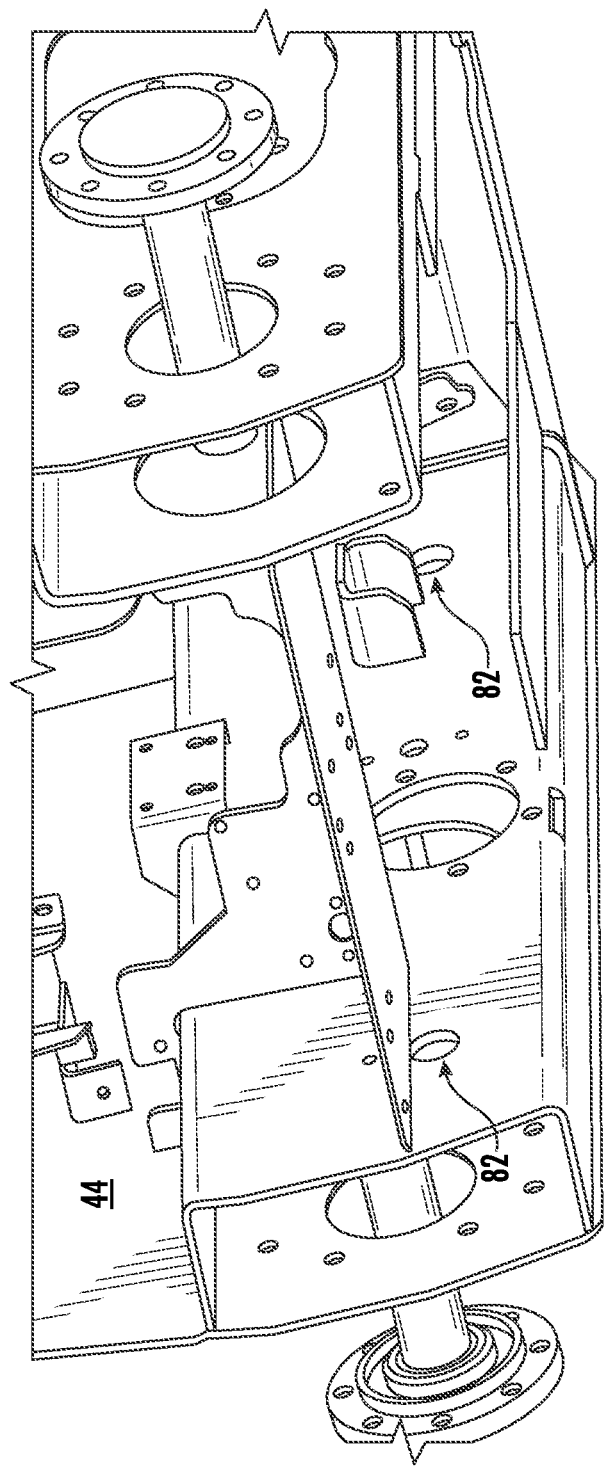
FIG. 35 shows porting holes for venting the electric motor, according to an exemplary embodiment.

FIG. 35 shows porting holes 82 for venting electric motor 16. Electric motor 16 may be disposed in chain-case 42 of a conventional diesel design. As shown in FIG. 35, a diesel engine loader includes a chain-case 42 that receives torque/speed from the diesel engine to drive wheels 14. In the illustrated design, electric motors 16 are located in this area and release heat generated by electric motor 16 into this space. Chain-case 42 can be retrofitted to release this heat to an interior of cab 66 or out to the surrounding environment. Similarly, electric motor-hub assembly 56 may be retrofitted more internal to chain-case 42, such that electric motor 16 is inside cab 66 and drive gear reducer 36 extends into chain-case 42. In this configuration, powered rotating hub 38 extends at or near a side of body 44, such that wheels 14 are located adjacent to body 44, and the electric motor-hub assembly is installed substantially within body 44.

Figure 36:
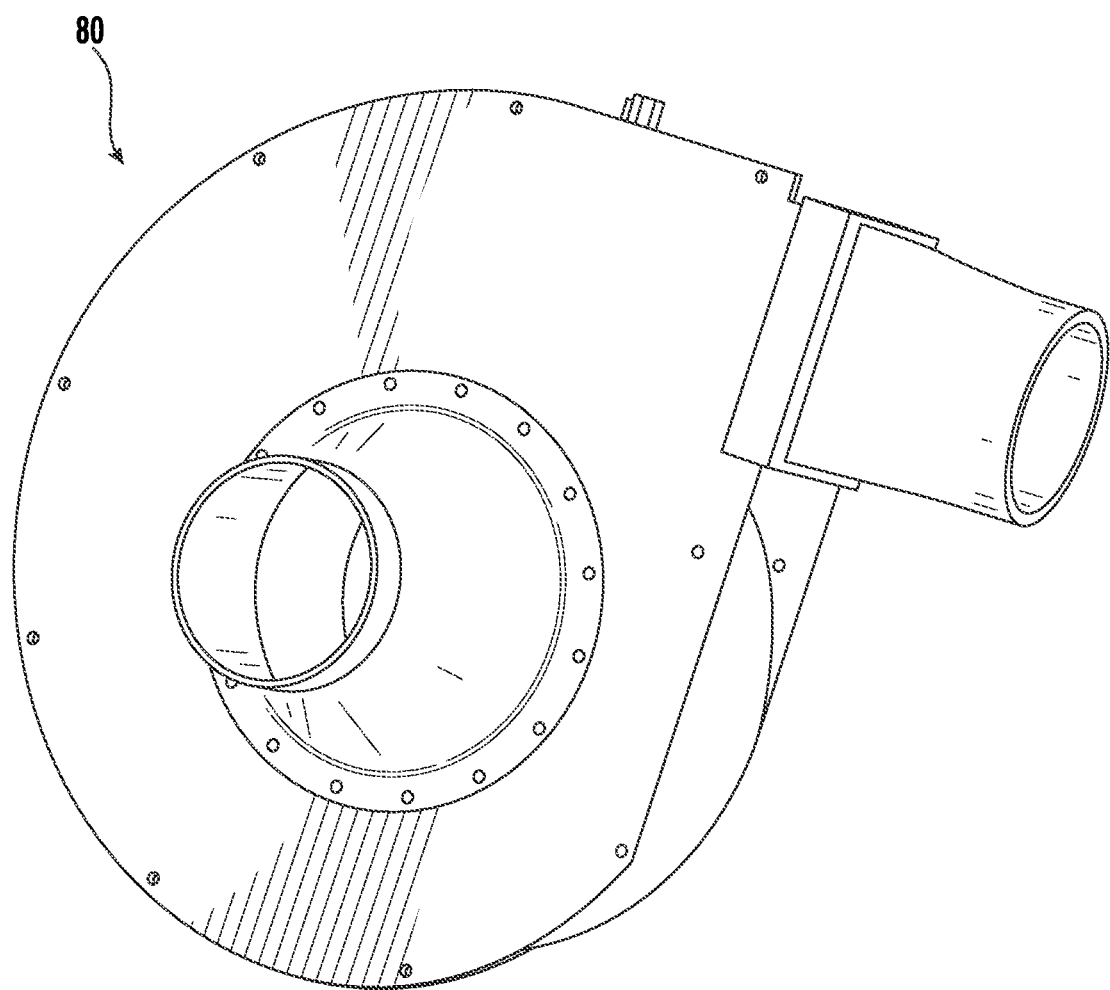
FIG. 36 is a squirrel fan for forced-air venting of electric motors, according to an exemplary embodiment.

FIG. 36 shows a squirrel fan 80 for a central forced-air venting system 60 that feeds cooling ducts 48 coupled to each electric motor 16. For example, a single fan 80 receives filtered, cleaned, and/or cooled air from a supply source (e.g., dehumidified, particulate-free, and/or air-conditioned air). Fan 80 circulates forced-air through cooling ducts 48 leading to electric motors 16. Electric motors 16 direct the forced-air through gaps 62 in the rotor 50, stator 54, and/or other areas of electric motor 16 and exhaust the air outside electric motor 16. For example, chain-case 42 inside or outside cab 66, or in a user-controlled fashion such that an operator can direct the exhaust of the heated air (e.g., to heat or cool cab 66).

Figure 37:
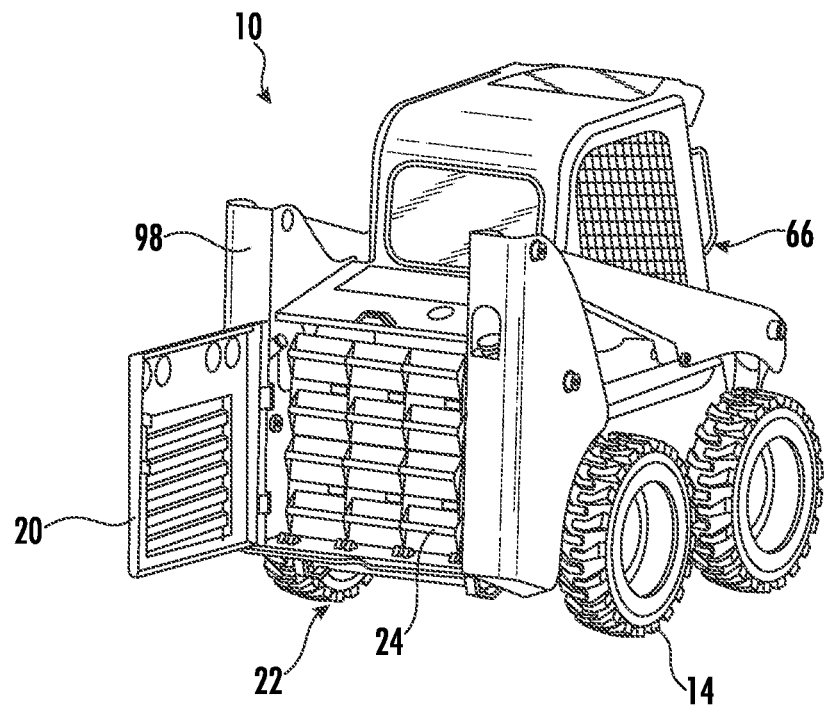
FIG. 37 is a perspective back view of a battery panel accessed by opening a backdoor of the electric loader, according to an exemplary embodiment.
Figure 38:
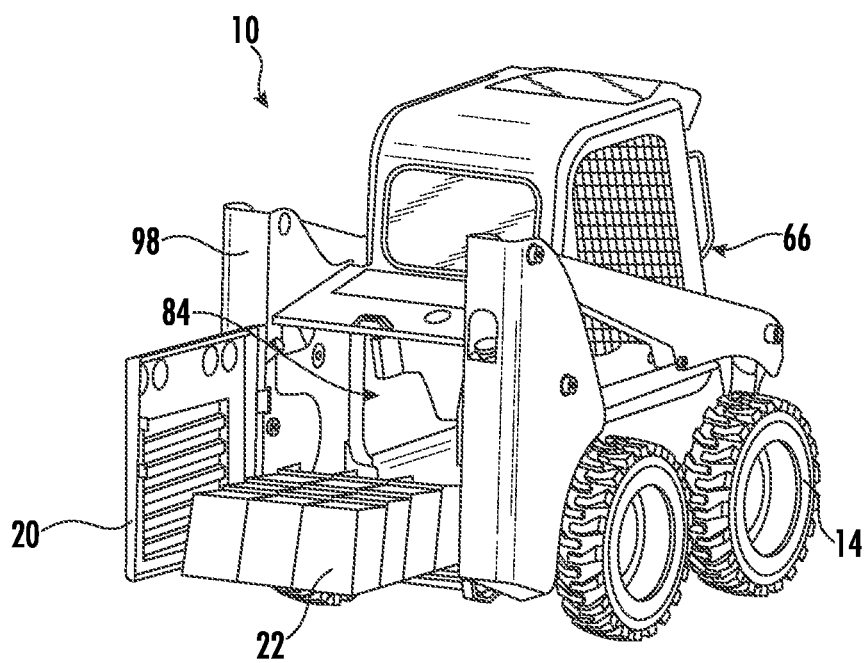
FIG. 38 is a perspective back view of the battery panel of FIG. 37, wherein the battery panel has been rotated to provide access to an internal cavity of a cab, according to an exemplary embodiment.

FIGS. 37 and 38 are perspective back views of a battery panel 22 accessed by opening backdoor 20 of electric loader 10. FIG. 37 shows battery panel 22 in an upright or locked position. In this position, battery panel 22 serves as a counter-weight or ballast for the load applied at a front end (e.g., a bucket auxiliary unit 76 of electric loader 10). Similarly, FIG. 38 shows battery panel 22 rotated to an unlocked or open position to provide access to an internal cavity 84 of cab 66.

Figure 39:
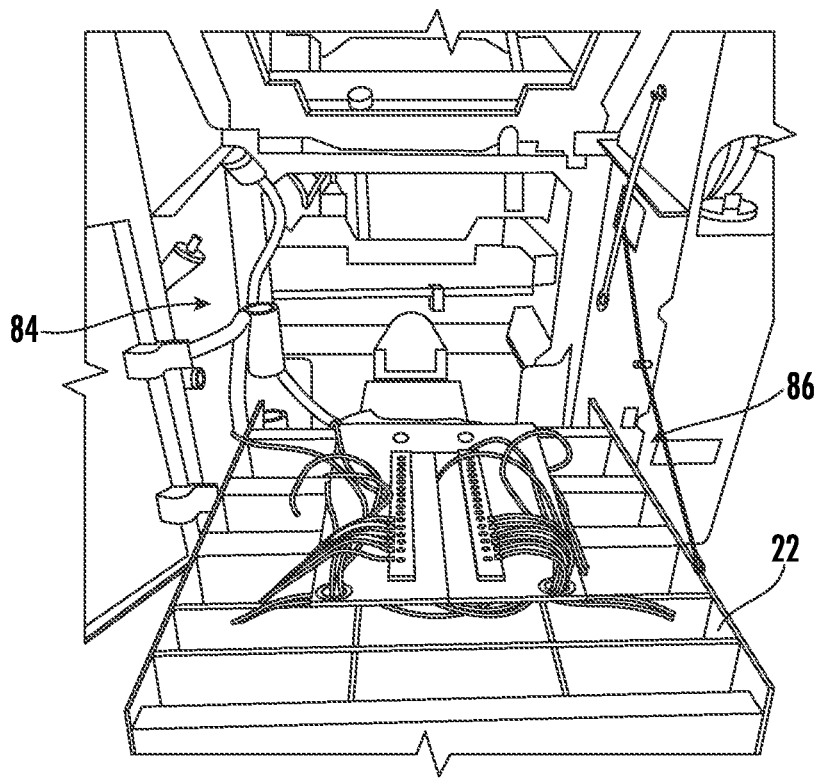
FIG. 39 is a top view of the backside of the battery panel shown in FIG. 38 to show the wires interconnecting the batteries to provide power to each electric motor assembly, according to an exemplary embodiment.
Figure 40:
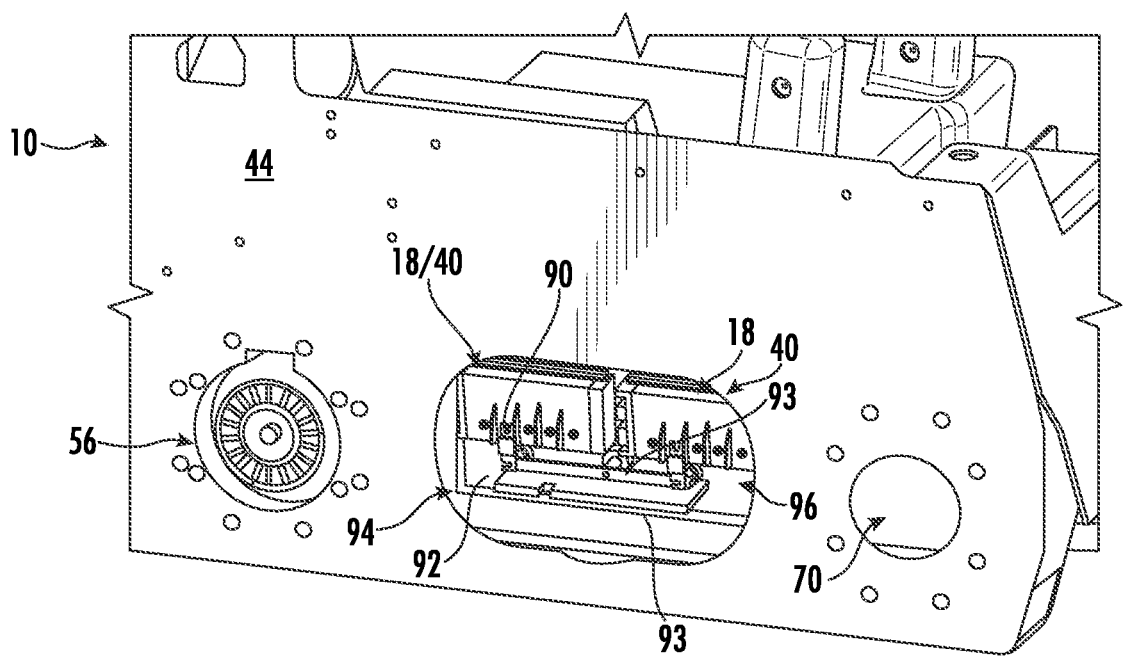
FIG. 40 shows a motor controller coupled to an electric motor that controls and/or regulates the electric energy delivered to the electric motor, according to an exemplary embodiment.
Figure 41:
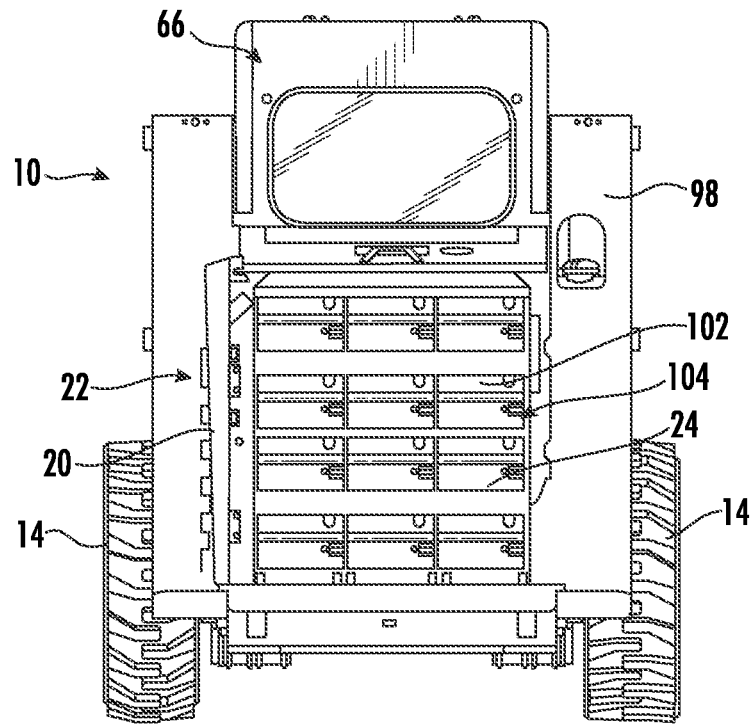
FIG. 41 is an isometric back view of the electric loader that shows the battery panel in an upright position and the open backdoor, according to an exemplary embodiment.
Figure 42:
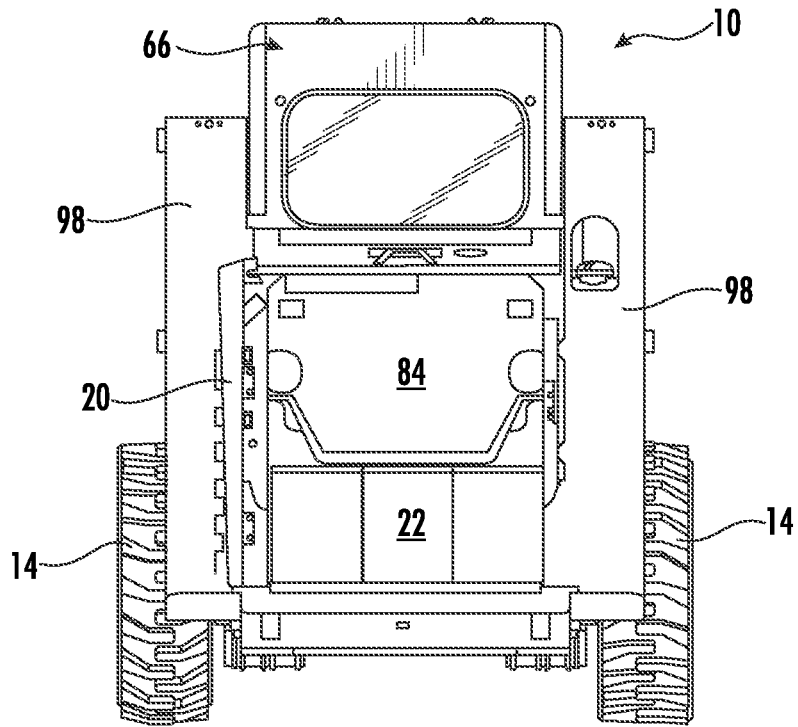
FIG. 42 is an isometric back view of FIG. 41 wherein the battery panel is rotated into a lowered position to provide access to the internal cavity of the cab.
Figure 43:
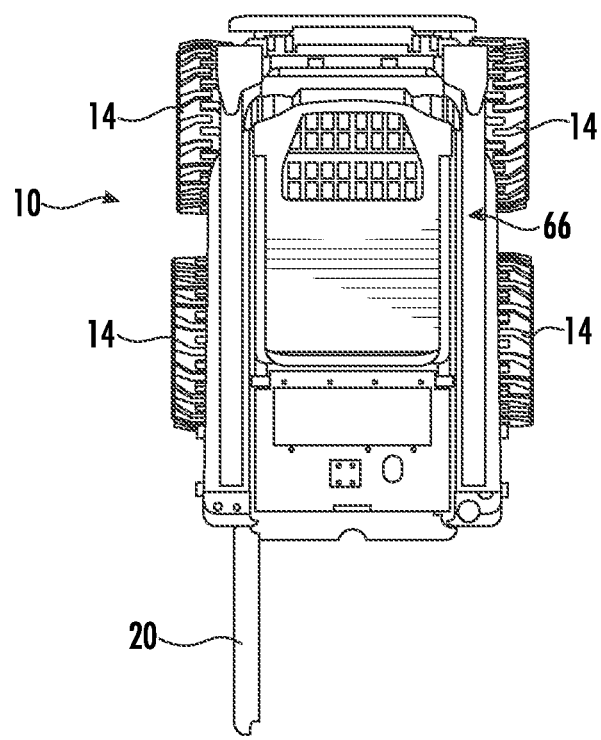
FIG. 43 is a top isometric view of the electric loader FIG. 41 showing the open backdoor.
Figure 44:
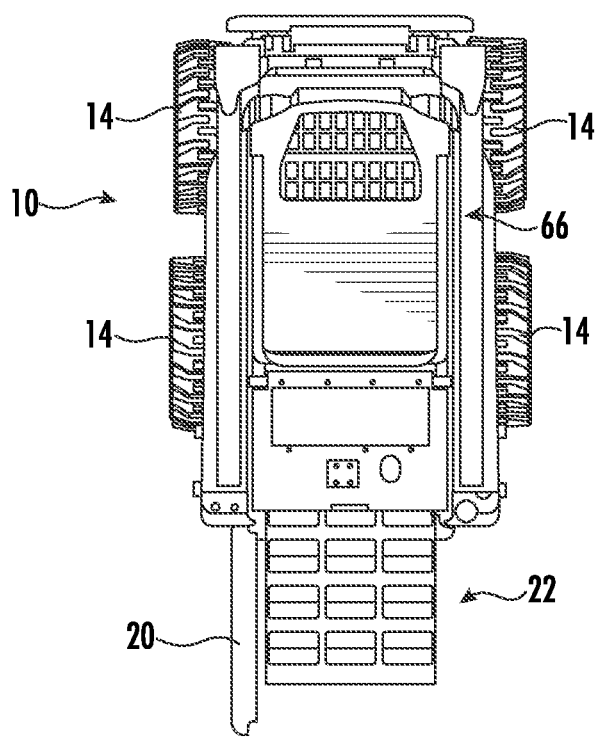
FIG. 44 is a top isometric view of the electric loader of FIG. 42 showing the battery panel rotated into a lowered position to provide access to the internal cavity of the cab.

FIGS. 39 and 40 show the interconnection between battery panel 22 and controller 40. Specifically, battery panel 22 includes wired connections 86 between power cells 24 (e.g., individual batteries). Wired connections 86 are located on an interior side of battery panel 22, e.g., adjacent the internal cavity 84, such that the wired connections 86 are not visible to an operator. The wires 88 couple to a controller 40 adjacent individual electric motors 16. For example, each electric motor 16 has a controller 40, fuse 90, heat sink plate 92, positive and negative terminals 93 (FIG. 17). The central processor receives signals from each motor controller 40 and transmitters 94 and/or receivers 96 from one or more sensors 30 related to traction, slip, weight, and/or load at each electric motor 16 and/or wheel 14. In other words, sensor 30 data is communicated to the processor and provides feedback to an operator, automates operation of electric loader, display 74 warnings, and/or enhance independent traction and/or drive of each wheel 14 independently. FIG. 39 shows a top view of the inside of battery panel 22 that includes wires 88 interconnecting battery cells 24 to electric motors 16 and/or controllers 40 to provide individualized power for each electric motor-hub assembly 56. FIG. 40 shows individual motor controllers 40 or control panels coupled to each electric motor 16 to control and/or regulate electric energy/power delivered to electric motor 16.

Figure 45:
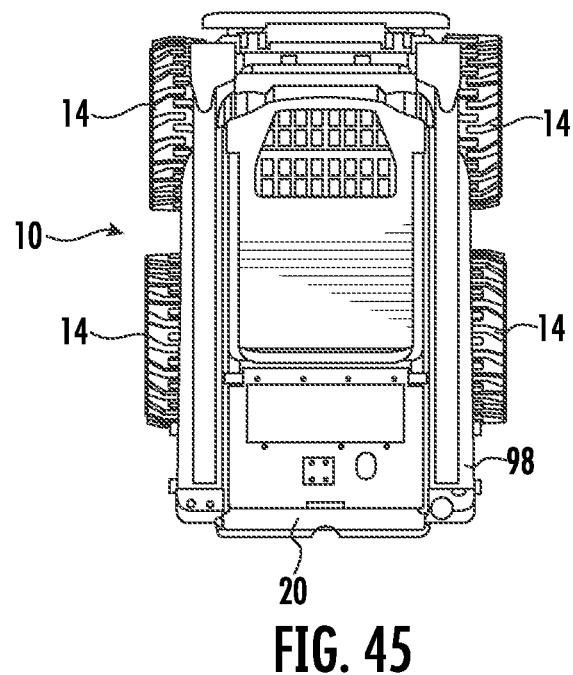
FIG. 45 is a top isometric view of the electric loader with a closed backdoor and the installed battery panel in an upright position to provide a counterweight to the front end of the loader, according to an exemplary embodiment.
Figure 46:
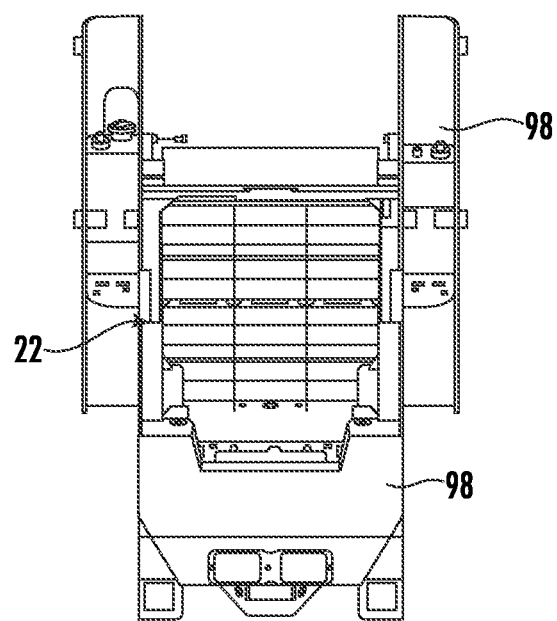
FIG. 46 is an isolated view of a rotating battery panel, according to an exemplary embodiment.

FIGS. 41 to 44 show isometric top (FIGS. 43 and 44) and back (FIGS. 41 and 42) views of electric loader 10 with backdoor 20 open to show battery panel 22 in an upright or locked position (FIGS. 41 and 43) and rotated into a lowered or unlocked position (FIGS. 42 and 44) to provide access to internal cavity 84 of cab 66. FIG. 45 is a top isometric view of electric loader 10 with a closed backdoor 20 to show the operating configuration of electric loader 10. In this configuration, the installed battery panel 22 is in an upright or locked position and provides a counterweight to front end (e.g., bucket) of loader arm 26 and/or electric loader 10.

Figure 47:
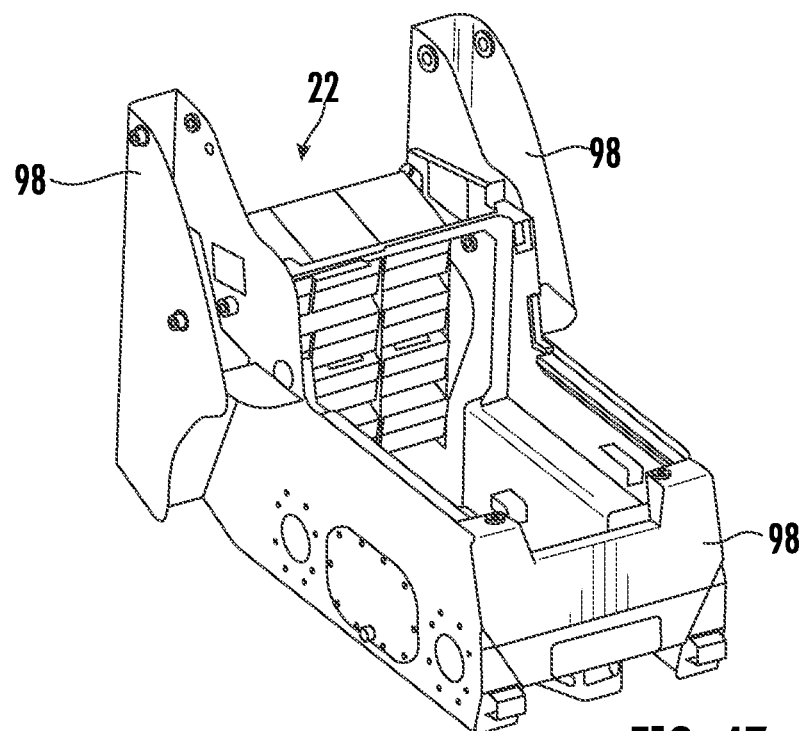
FIG. 47 is a top side perspective view of an isolated rotating battery panel showing in the upright or locked position.
Figure 48:
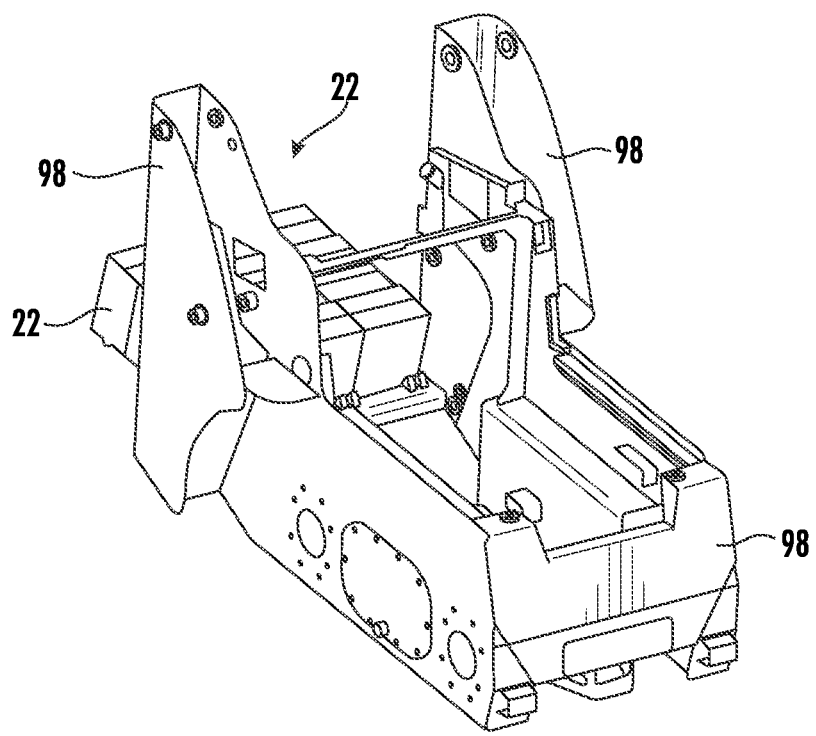
FIG. 48 is a top side perspective view of an isolated rotated battery panel shown in the lower or open position.
Figure 49:
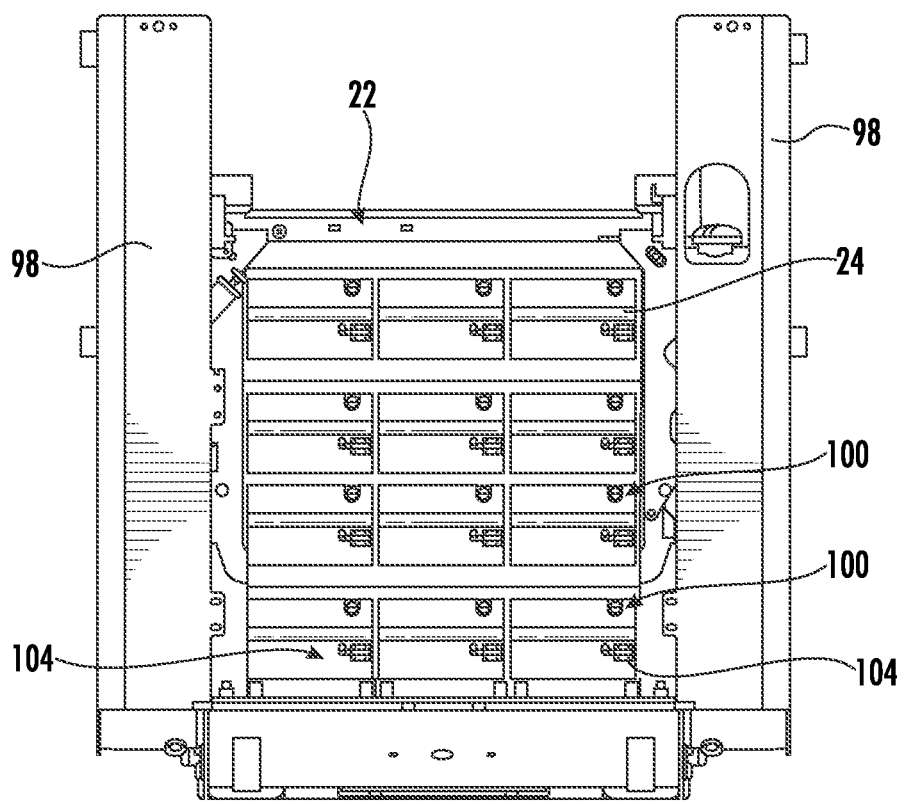
FIG. 49 is an isometric view of a backside of the battery panel inside the isolated frame and in a locked upright position.

FIGS. 46 to 49 show isolated views of a rotating battery panel 22 located within a frame 98 that can insert into electric loader arm 26. In some embodiments, frame 98 and/or battery panel 22 is removed from electric loader 10 or added to an existing (e.g., diesel) frame to retrofit a power supply to an existing design. FIG. 47 is a top perspective view of an isolated rotating battery panel 22 and frame 98 shown in an upright or locked position. FIG. 48 is a top perspective view of an isolated rotated battery panel 22 and frame shown in an unlocked, lowered, or open position. FIG. 49 is an isometric view of a backside of battery panel 22 located inside frame 98 in a locked upright position.

Figure 50:
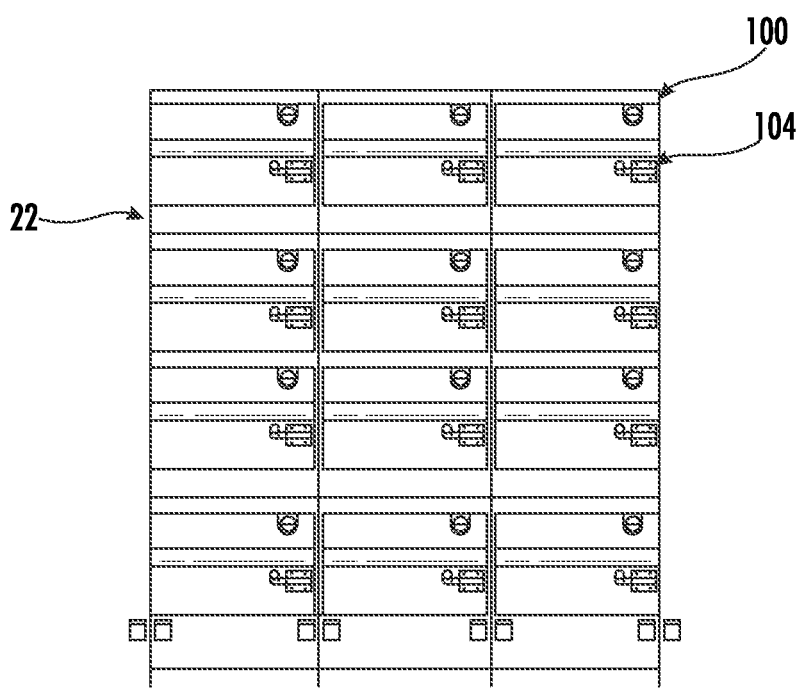
FIG. 50 is an isolated view of the battery panel showing various control knobs and ports to charge individual battery cells and/or remove battery cells.

FIG. 50 is an isolated view of battery panel 22 showing various control knobs and charging ports 100 to charge individual battery cells 24 and/or remove battery cells 24. For example, each battery cell 24 is locked in a box 102 with a locking mechanism 104. Locking mechanism 104 can be released to replace or repair an individual battery cell 24. Similarly, a charging port 100 is located in each box 102 to couple individual charges to each battery cell 24. For example, each battery cell 24 can be charged independently and/or collectively at charging ports 100. For example, a single charging port 100 is used to charge all battery cells 24 in battery panel 22, or individual charging ports 100 isolate a single battery cell 24 for independent recharging.

Figure 51:
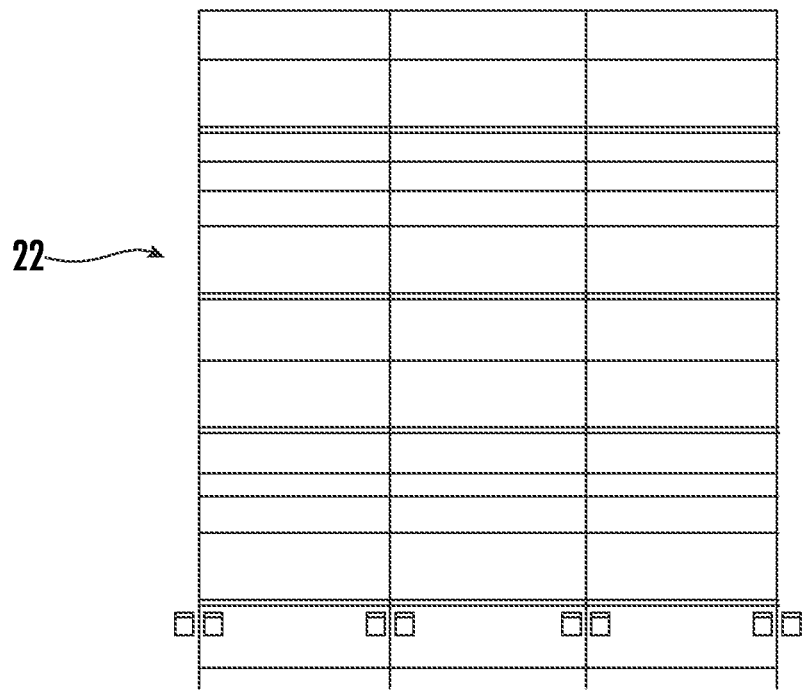
FIG. 51 is an isolated view of the battery panel from an inside of the cab, showing a variety of storing locations for a plurality of battery cells.
Figure 52:
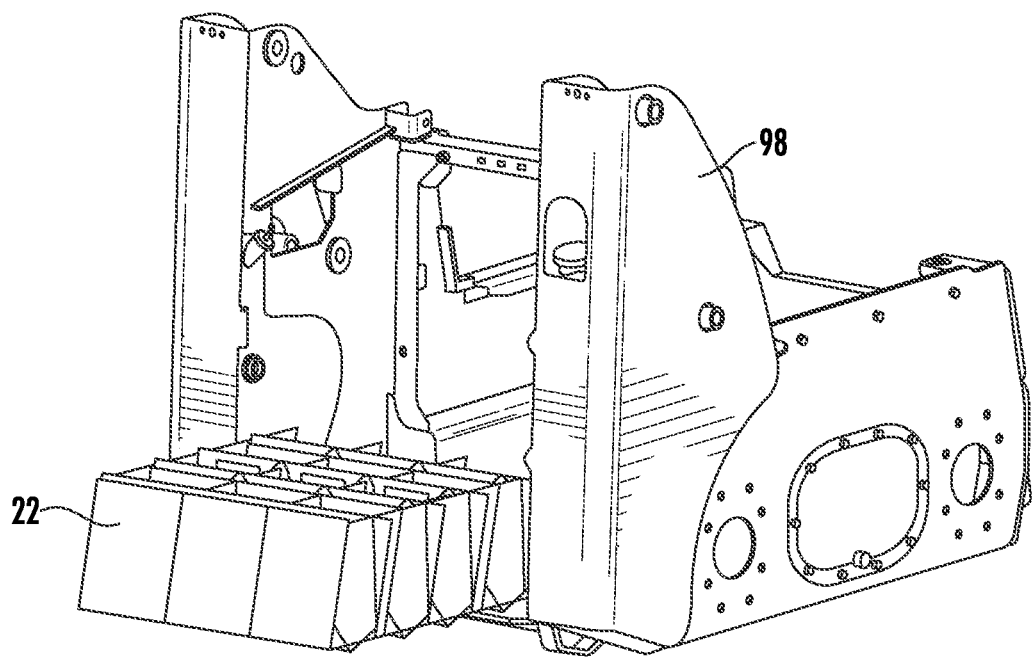
FIG. 52 is a side perspective view of the rotated battery panel in an unlocked position to provide access to an internal cavity of the frame.

FIG. 51 is an isolated view of the battery panel 22 from inside cab 66 and shows a plurality of storing locations or boxes 102 for a plurality of battery cells 24. In some embodiments, each battery cell 24 is locked with a locking mechanism 104 inside a box 102 of battery panel 22. FIG. 52 is a side perspective view of battery panel 22 rotated into an unlocked position to provide access to internal cavity 84 of frame 98 and/or cab 66. In this configuration, each battery cell 24 is locked inside battery panel 22, such that all battery cells 24 remain locked within battery panel 22 when the panel is rotated away from frame 98. In some embodiments, the kinematics of the rotation of battery panel 22 assists in the rotation from a locked to an unlocked position. For example, battery panel 22 is spring-loaded to return the panel to the locked position (e.g., closed).

Figure 53:
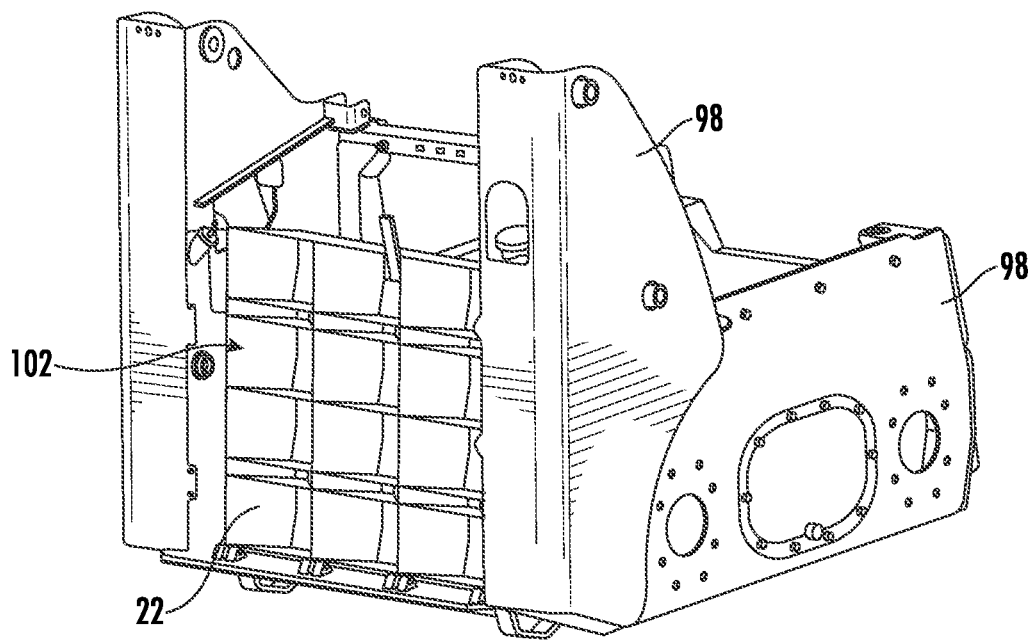
FIG. 53 is a side perspective view of an empty battery panel in the locked upright position, without any installed battery cells.
Figure 54:
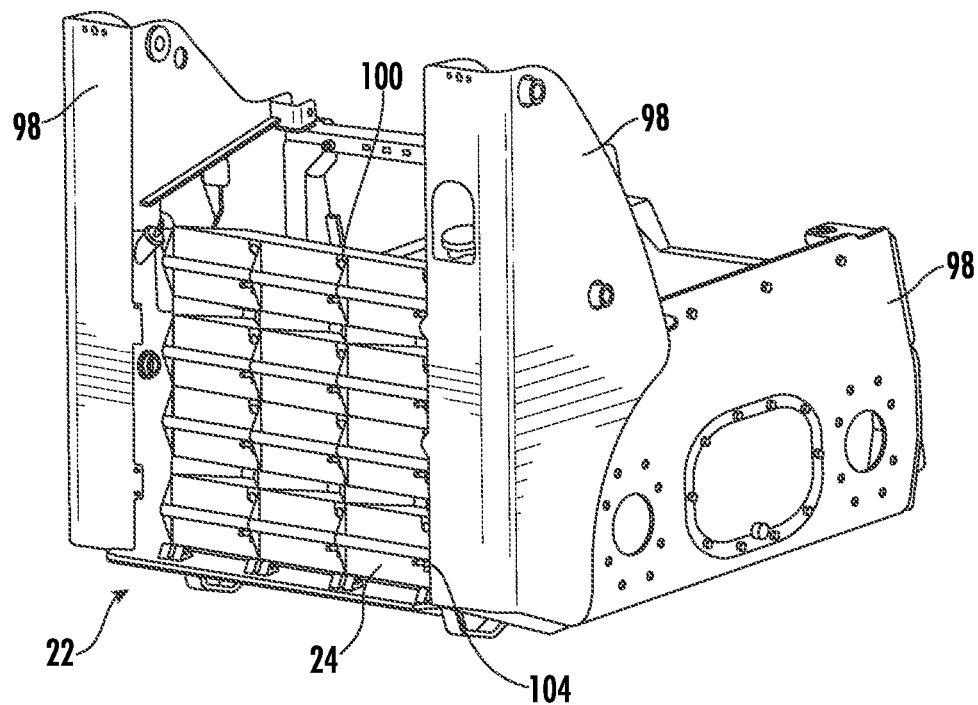
FIG. 54 is a side perspective view of the battery panel of FIG. 53 with installed battery cells.
Figure 55:
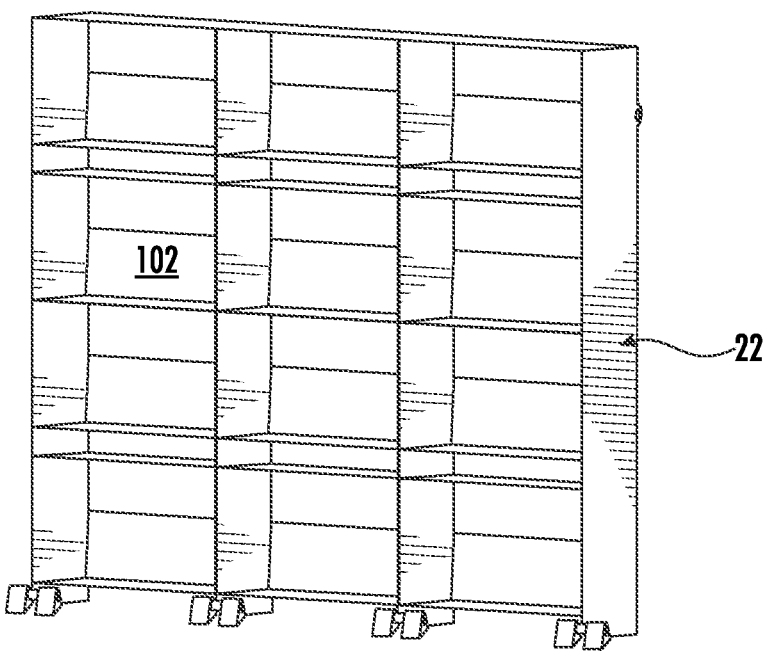
FIG. 55 is a side perspective view of an empty battery tray.
Figure 56:
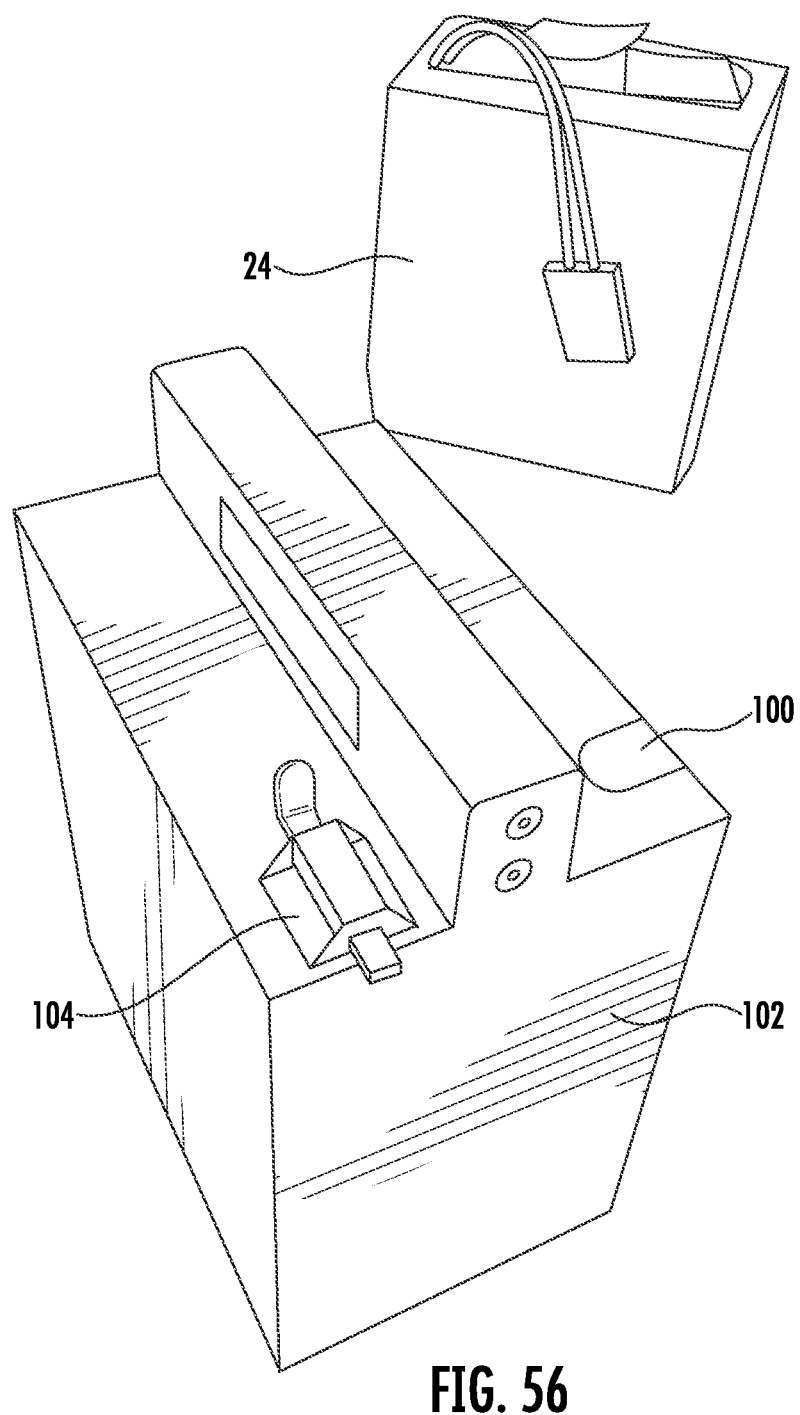
FIG. 56 shows a battery cell and a battery box that is secured into a battery panel of FIG. 55.
Figure 57:
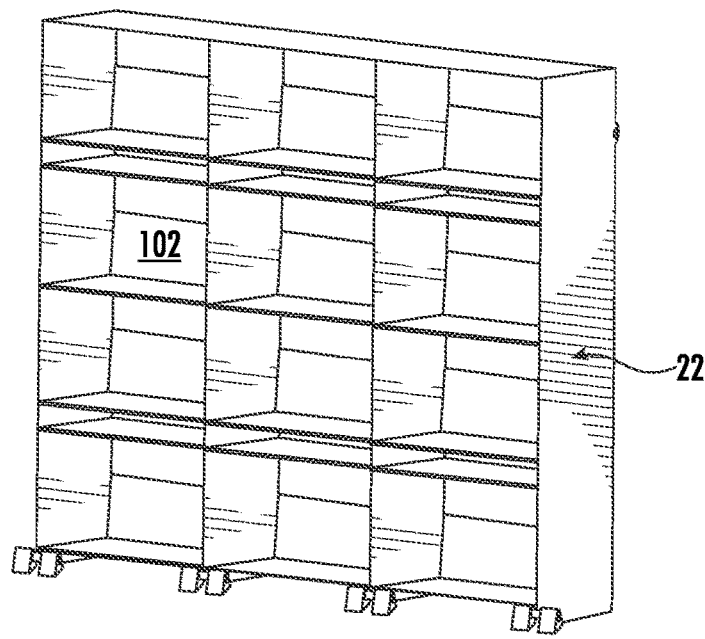
FIG. 57 is a side perspective view of an empty battery tray.

FIG. 53 is a side perspective view of an empty battery panel 22 in the locked or upright position. As shown, empty battery panel 22 does not have a locking mechanism 104 and is shown without installed battery cells 24. In contrast, FIG. 54 shows battery panel 22 with installed battery cells 24, locking mechanisms 104 for each box 102, and a charging port 100 for each individual battery cell 24. FIGS. 55 and 57 show empty battery trays without locking mechanisms 104 or battery cells 24. FIG. 56 shows a battery cell 24 and an individual battery box 102 that secures battery cell 24 in battery panel 22.

Figures 58, 59:
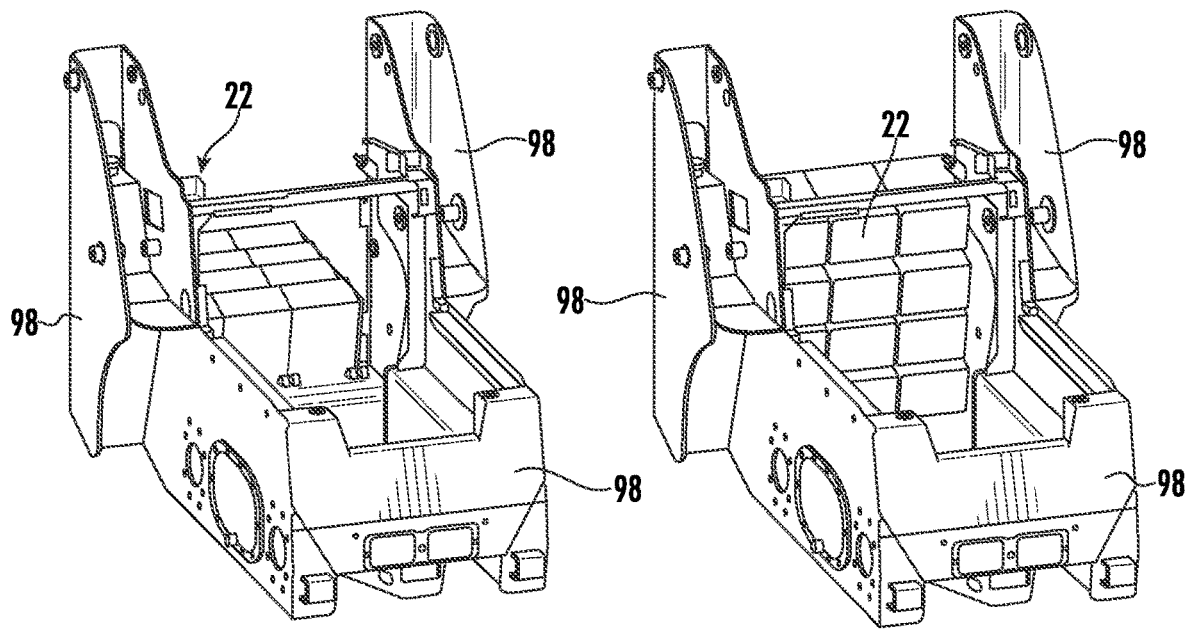
FIG. 58 is a front perspective view of the battery pack in a rotated or unlocked position within the frame.
FIG. 59 is a front perspective view of the battery pack in an upright or locked position within the frame.
Figure 60:
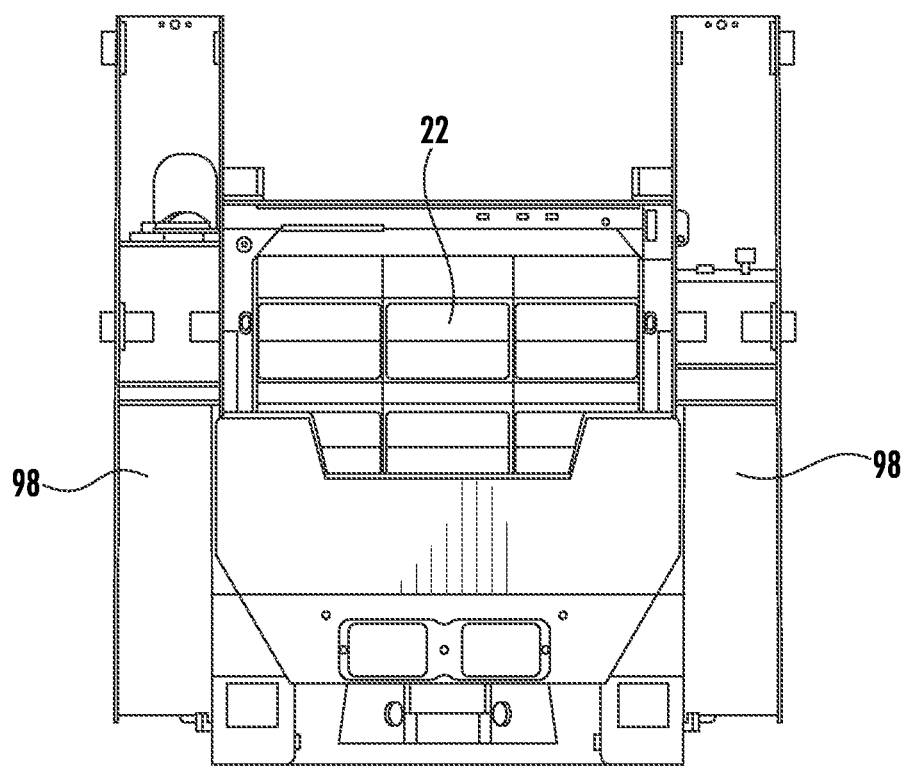
FIG. 60 is an isometric front view of the battery pack showing in FIG. 59.

FIGS. 58 and 59 are front views of battery panel 22 in a rotated or unlocked position (FIG. 58) and an upright or locked position (FIG. 59) within the frame. FIG. 60 is an isometric front view of battery panel 22 within frame 98. In this view, a backside of battery panel 22 is shown that includes wires 88 and wired coupling of battery cells 24. As shown in FIGS. 37-39 frame 98 and battery panel 22 is inserted into body 44 of electric loader 10 and may be used to retrofit an existing loader with electrical power, e.g., for converting a conventional loader with electrical power at individual electric motors 16 at each wheel 14 or rotating hub 38.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions, and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths, and radii, as shown in the Figures, are to scale. Actual measurements of the Figures will disclose relative dimensions, angles, and proportions of the various exemplary embodiments. Various exemplary embodiments extend to various ranges around the absolute and relative dimensions, angles, and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. An electric loader comprising:
   a chassis including a front end, a rear end, a first side extending between the front end and the rear end, and a second side extending between the front end and the rear end, the second side being offset from and parallel with the first side, the first and second sides being generally perpendicular to the front and rear ends;
   a first external drive assembly coupled to and supporting the chassis at the first side relative to a surface;
   a second external drive assembly coupled to and supporting the chassis at the second side relative to the surface;
   a battery panel pivotally supported at the rear end of the chassis between an upright, locked position in which the battery panel is positioned within the chassis and an open, unlocked position in which the battery panel extends at least partially outside of the chassis; and
   a plurality of batteries electrically coupled to at least one motor and fastened to the battery panel.

2. The electric loader of claim 1, wherein the first and second external drive assemblies each include a pair of wheels.

3. The electric loader of claim 1, wherein the first and second external drive assemblies each include a track.

4. The electric loader of claim 1, further comprising an access door pivotally supported at the rear of the electric loader to pivot between an open position and a closed position to enclose the battery panel within the chassis when the battery panel is in the upright, locked position and the access door is in the closed position.

5. The electric loader of claim 4, wherein the access door pivots along an axis perpendicular to the surface when pivoting between the open position and the closed position.

6. The electric loader of claim 1, wherein the battery panel pivots along an axis parallel to the surface when pivoting between the upright, locked position and the open, unlocked position.

7. The electric loader of claim 1, further comprising a removable access panel supported at the rear of the electric loader to enclose the battery panel and batteries within the chassis when the battery panel is in the upright, locked position, the access panel being removable to permit pivoting of the battery panel to the open, unlocked position.

8. An electric loader comprising:
   a chassis including a front end, a rear end, a first side extending between the front end and the rear end, and a second side extending between the front end and the rear end, the second side being offset from and parallel with the first side, the first and second sides being generally perpendicular to the front and rear ends;
   a first wheel rotatably supported at the first side and coupled to a first electric motor;
   a second wheel rotatably supported at the second side and coupled to a second electric motor;
   a hydraulic attachment supported by the front end of the chassis;
   a battery panel pivotally supported at the rear end of the chassis between an upright, locked position which is parallel to the rear end and an open, unlocked access position; and
   a plurality of batteries electrically coupled to the first and second electric motors, each battery being removably fastened to the battery panel and accessible from an exterior of the electric loader when the battery panel is in the open, unlocked position.

9. The electric loader of claim 8, wherein the hydraulic attachment comprises a pair of lift arms moveable with hydraulic cylinders and a bucket pivotally coupled to the pair of lift arms.

10. The electric loader of claim 8, further comprising a third electric motor mounted at the first side and coupled to a third wheel, and a fourth electric motor mounted at the second side and coupled to a fourth wheel.

11. The electric loader of claim 10, wherein the first electric motor, the second electric motor, the third electric motor, and the fourth electric motor are all coupled to a central processor designed to provide independent control each of the first electric motor, the second electric motor, the third electric motor, and the fourth electric motor.

12. The electric loader of claim 8, wherein the battery panel is a counter-weight for the hydraulic attachment when in the upright, locked position.

13. The electric loader of claim 8, wherein the battery panel includes wired connections between the plurality of batteries, a controller, and the first and second electric motors.

14. The electric loader of claim 13, wherein the wired connections are located on an interior side of the battery panel facing an internal cavity of the electric loader when the battery panel is in the upright, locked position.

15. The electric loader of claim 8 wherein each of the plurality of batteries is selectively locked into a box using a locking mechanism.

16. The electric loader of claim 8, wherein each of the plurality of batteries is positioned in a box, each box including a charging port to couple one or more chargers to the plurality of batteries.

17. An electric loader comprising:
   a body;
   a battery panel frame; and
   a battery panel pivotably coupled to the battery panel frame, the battery panel including a plurality of boxes for supporting a plurality of batteries and the battery panel being rotatable between an upright position wherein the battery panel is positioned within the battery panel frame and a lowered position wherein the battery panel is positioned at least partially outside of the battery panel frame,
   wherein the battery panel frame and battery panel are selectively removable from the body.

18. The electric loader of claim 17, wherein each of the plurality of boxes includes a charging port such that each of the plurality of batteries are individually recharged.

19. The electric loader of claim 17, wherein the battery panel is spring-loaded to return the battery panel to the upright position from the open position.

20. The electric loader of claim 17, wherein each of the plurality of boxes are lockable such that the plurality of boxes remain locked when the battery panel is rotated between the upright position and the open position.

\* \* \* \* \*